(12) United States Patent
Hasuo et al.

(10) Patent No.: US 8,738,555 B2
(45) Date of Patent: May 27, 2014

(54) DATA PROCESSING DEVICE, DATA PROCESSING METHOD, AND PROGRAM

(75) Inventors: Takashi Hasuo, Tokyo (JP); Kohtaro Sabe, Tokyo (JP); Kenta Kawamoto, Tokyo (JP); Yukiko Yoshiike, Tokyo (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 13/248,296

(22) Filed: Sep. 29, 2011

(65) Prior Publication Data

US 2012/0084237 A1 Apr. 5, 2012

Related U.S. Application Data

(63) Continuation-in-part of application No. 12/791,240, filed on Jun. 1, 2010.

(30) Foreign Application Priority Data

Jun. 11, 2009 (JP) ................................. 2009-140065
Oct. 4, 2010 (JP) ................................. 2010-225156

(51) Int. Cl.
*G06F 15/18* (2006.01)

(52) U.S. Cl.
USPC .......................................................... 706/25

(58) Field of Classification Search
None
See application file for complete search history.

(56) References Cited

U.S. PATENT DOCUMENTS

2010/0318478 A1* 12/2010 Yoshiike et al. ................ 706/12
2011/0010176 A1* 1/2011 Yoshiike et al. ........... 704/256.2
2011/0112997 A1* 5/2011 Sabe .............................. 706/12

OTHER PUBLICATIONS

Leslie Pack Kaelbling, et al., "Reinforcement Learning: A Survey," Journal of Artificial Intelligence Research 4, 1996, pp. 237-285.

* cited by examiner

*Primary Examiner* — Kakali Chaki
*Assistant Examiner* — Ababacar Seck
(74) *Attorney, Agent, or Firm* — Sony Corporation of America

(57) ABSTRACT

A data processing device includes a state value calculation unit which calculates a state value of which the value increases as much as a state with a high transition probability for each state of the state transition model, an action value calculation unit which calculates an action value, of which the value increases as a transition probability increases for each state of the state transition model and each action that the agent can perform, a target state setting unit which sets a state with great unevenness in the action value among states of the state transition model to a target state that is the target to reach by action performed by the agent, and an action selection unit which selects an action of the agent so as to move toward the target state.

18 Claims, 26 Drawing Sheets

FIG. 10

EXAMPLE OF
EXISTENCE PROBABILITY T

ACTION ENVIRONMENT

| 0.2 | 0.7 | 1.0 | 1.0 | 1.0 |
|---|---|---|---|---|
| 0.0 | 0.4 | 0.8 | 1.0 (current) | 1.0 |
| 0.4 | 0.7 (goal) | 1.0 | 1.0 | 0.9 |
| 1.0 | 0.3 | 0.8 | 0.9 | 0.6 |

(LEARNING) TARGET STATE

CANDIDATE OF TARGET STATE

EXISTENCE PROBABILITY T WHEN STATE TRANSITION IS PERFORMED N TIMES IS OBTAINED BY SETTING $T_{current} = 1$ AND $T_{other} = 0$ AND REPEATING $$T(S) \leftarrow \max_U \Sigma_{S'} P_{SS'}^U T(S')$$

N TIMES.
STATE OF T > 0 IS RANDOMLY SELECTED AMONG CANDIDATES TO SET TO TARGET STATE.

FIG. 11

EXAMPLE OF STATE VALUE V

TARGET STATE

| 0.3 | 0.5 | 0.7 | 0.8 | 0.6 |
|---|---|---|---|---|
| 0.6 | 0.7 | 0.9 | 1.0 (goal) | 0.9 |
| 0.4 | 0.6 | 0.8 | 0.9 | 0.8 |
| 0.3 | 0.5 | 0.7 | 0.6 | 0.7 |

ACTION ENVIRONMENT

STATE VALUE IS CALCULATED BY SETTING $R_{goal} = 1$ AND $R_{other} = 0$, AND REPEATING RECURRENCE FORMULA $$V(S) \leftarrow \max_U \Sigma_{S'} P_{SS'}^U [R_{S'} + \gamma V(S')]$$

THAT PROPAGATES WITH ATTENUATION WITH $\gamma < 1$ THE SATISFACTORY NUMBER OF TIMES

HMM OF THE PAST

STATE TRANSITION PROBABILITY A

EXTENDED HMM

DATA PROCESSING DEVICE, DATA PROCESSING METHOD, AND PROGRAM

The present application is a continuation-in-part of application Ser. No. 12/791,240 filed on Jun. 1, 2010, which makes reference to, claims priority to and claims benefit from Japanese Priority Patent Application JP 2009-140065 filed in the Japan Patent Office on Jun. 11, 2009. The present disclosure contains subject matter related to that disclosed in Japanese Priority Patent Application JP 2010-225156 filed in the Japan Patent Office on Oct. 4, 2010, the entire contents of which are hereby incorporated by reference.

BACKGROUND

The present disclosure relates to a data processing device, a data processing method, and a program, and particularly to a data processing device, a data processing method, and a program which enable an agent that can autonomously perform various actions (autonomous agent) to efficiently perform learning of an unknown environment.

For example, as a learning method in which an agent such as a robot acting in the real world, a virtual character acting in a virtual world, or the like, that can perform actions, performs actions in an unknown environment, there is reinforcement learning through which an agent learns rules of action stage by stage (Leslie Pack Kaelbling, Michael L. Littman, Andrew W. Moore, "Reinforcement Learning: A Survey", Journal of Artificial Intelligence Research 4 (1996) 237-285).

In the reinforcement learning, an action value of each action U by an agent performed to reach a state targeted (target state) in a state recognized based on an observation value observed from the outside (environment, or the like) (current state) is calculated (estimated).

When the action values for reaching the target state are calculated, the agent can perform actions for reaching the target state by controlling the actions based on the action values.

SUMMARY

The time when the agent performs action control based on such action values is after the agent reaches the target state and the action values used for reaching the target state are calculated based on reinforcement learning.

Thus, the agent has to perform actions randomly selected from, for example, actions that the agent can perform until the agent reaches the target state, whereby it is difficult to efficiently perform learning of the unknown environment (reinforcement learning).

In other words, when there is, for example, a narrow passage that is hard for the agent to pass through in the environment where the agent acts (action environment), the agent that performs randomly selected actions is not able to pass through the narrow passage, and as a result, it is difficult for the agent to learn the environment after passing through the narrow passage.

In addition, when gravity is set in an action environment movable to the upper and lower side, for example, it is difficult for the agent that performs randomly selected actions to move to the upper side in the action environment due to the influence of gravity, and as a result, it is difficult to learn the upper side of the action environment.

The disclosure takes the above circumstances into consideration, and it is desirable to be able to efficiently learn an unknown environment.

According to an embodiment of the disclosure, there is provided a data processing device which includes: or a program which causes a computer to function as a data processing device including: a state value calculation unit which calculates a state value having a predetermined state of a state transition model, in which a state is transited by an action performed by an agent that can act, set as a reference, of which the value increases as much as a state with a high transition probability to a state close to the predetermined state, for each state of the state transition model based on the state transition model of each action; an action value calculation unit which calculates an action value, of which the value increases as a transition probability to a state with a high state value having the predetermined state set as a reference increases, for each state of the state transition model and each action that the agent can perform, based on the state transition model and the state value having the predetermined state set as a reference; a target state setting unit which sets a state with great unevenness in the action value among states of the state transition model to a target state that is the target to reach by action performed by the agent, based on the action value; and an action selection unit which selects an action of the agent so as to move toward the target state.

According to another embodiment of the disclosure, there is provided a data processing method of the data processing device including calculating a state value having a predetermined state of a state transition model, in which a state is transited by an action performed by an agent that can act, set as a reference, of which the value increases as much as a state with a high transition probability to a state close to the predetermined state, for each state of the state transition model based on the state transition model of each action, calculating an action value, of which the value increases as a transition probability to a state with a high state value having the predetermined state set as a reference increases, for each state of the state transition model and each action that the agent can perform, based on the state transition model and the state value having the predetermined state set as a reference, setting a state with great unevenness in the action value among states of the state transition model to a target state that is the target to reach by an action performed by the agent, based on the action value, and selecting an action of the agent so as to move toward the target state.

In the above embodiments, a state value having a predetermined state of a state transition model, in which a state is transited by an action performed by an agent that can act, set as a reference, is calculated of which the value increases as much as a state with a high transition probability to a state close to the predetermined state, for each state of the state transition model based on the state transition model of each action, and an action value is calculated, of which the value increases as a transition probability to a state with a high state value having the predetermined state set as a reference increases, for each state of the state transition model and each action that the agent can perform, based on the state transition model and the state value having the predetermined state set as a reference. In addition, a state with great unevenness in the action value among states of the state transition model is set to a target state that is the target to reach by an action performed by the agent, based on the action value, and an action of the agent so as to move toward the target state is selected.

Furthermore, the data processing device may be an independent device, or an internal block included in one device.

In addition, the program can be transmitted through a transmission medium, or provided by being recorded on a recording medium.

According to the embodiments of the disclosure, it is possible to efficiently learn an unknown environment where an agent acts.

BRIEF DESCRIPTION OF THE DRAWINGS

FIG. 10 is a diagram showing an example of an existence probability obtained for each small area obtained by partitioning an action area as a state;

FIG. 11 is a diagram showing an example of a state value having a target state set as a reference;

DETAILED DESCRIPTION OF EMBODIMENTS

[An Embodiment of a Data Processing Device to which the Disclosure is Applied]

Figure 1:
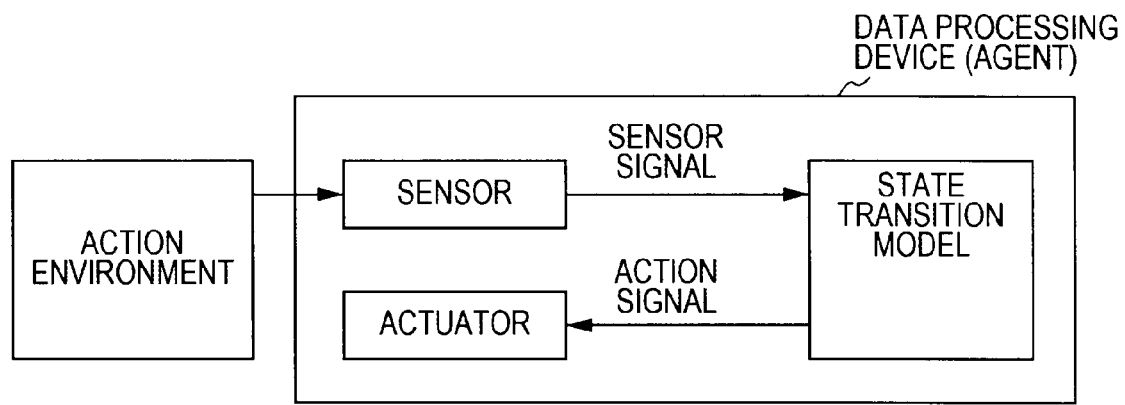
FIG. 1 is a diagram illustrating the overview of a configuration example of an embodiment of a data processing device to which the disclosure is applied.

FIG. 1 is a diagram illustrating the overview of a configuration example of an embodiment of a data processing device to which the disclosure is applied.

In FIG. 1, the data processing device is, for example, an agent that performs autonomous actions, and acts in a predetermined environment by driving an actuator.

In other words, the agent includes a sensor, and the sensor senses a physical amount from an environment where the agent acts (action environment), and sensor signals as observation values corresponding to the physical amount are output.

Furthermore, the agent has a state transition model for each action in which a state is transited by actions performed by the agent, and the state transition model is updated using observation values from the sensor (sensor signals) (learning of the state transition model is performed).

In addition, the agent includes an actuator. The agent selects an action that the agent performs based on the state transition model, and supplies an action signal corresponding to the action to the actuator.

The actuator is driven according to the action signal, and accordingly, the agent performs actions corresponding to the action signal in the action environment.

Figure 2:
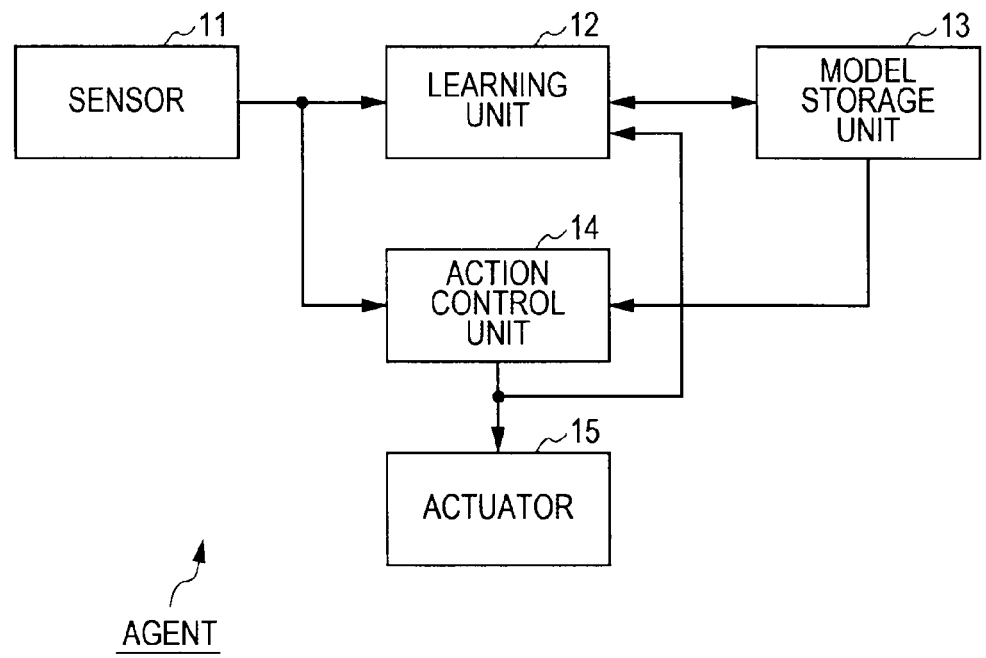
FIG. 2 is a block diagram showing a configuration example of an agent.

FIG. 2 is a block diagram showing a configuration example of an agent as the data processing device of FIG. 1.

The agent includes a sensor 11, a learning unit 12, a model storage unit 13, an action control unit 14, and an actuator 15.

The sensor 11 observes a physical amount from the outside, that is, an action environment, and outputs an observation value corresponding to the physical amount. The observation value output by the sensor 11 is supplied to the learning unit 12 and the action control unit 14.

Herein, as an observation value output by the sensor 11, for example, (a coordinate of) a position of the agent within the action environment is employed.

The observation value from the sensor 11 as well as the action signal from the action control unit 14 is supplied to the learning unit 12.

The learning unit 12 performs learning of a state transition model, which updates a state transition model, which is stored in the model storage unit 13, for each action using the observation value from the sensor 11 and the action signal from the action control unit 14.

In other words, the learning unit 12 recognizes the current state that is a state where the observation value from the sensor 11 is observed out of states of the state transition model, based on the observation value observed by the agent from the outside.

Furthermore, the learning unit 12 recognizes the action of the agent that obtains a state transition to the current state from action signals from the action control unit 14, and updates a state transition model of the action based on the state transition to the current state.

The model storage unit 13 stores state transition models for each action that the agent can perform.

The action control unit 14 controls the action of the agent based on an observation value from the sensor 11 and the state transition model stored in the model storage unit 13.

In other words, the action control unit 14 selects an action to be performed next (action to be performed in the current state) among actions that the agent can perform based on the observation value from the sensor 11 and the state transition model stored in the model storage unit 13, and supplies an action signal corresponding to the action to the learning unit 12 and the actuator 15.

The actuator 15 is, for example, a motor driving foot of the agent, or the like, an object (program) that moves the agent, or the like, and is driven according to action signals from the action control unit 14. The agent performs actions according to the action signal by the actuator 15 driven according to the action signal.

[Action Environment and Action of Agent]

Figure 3:
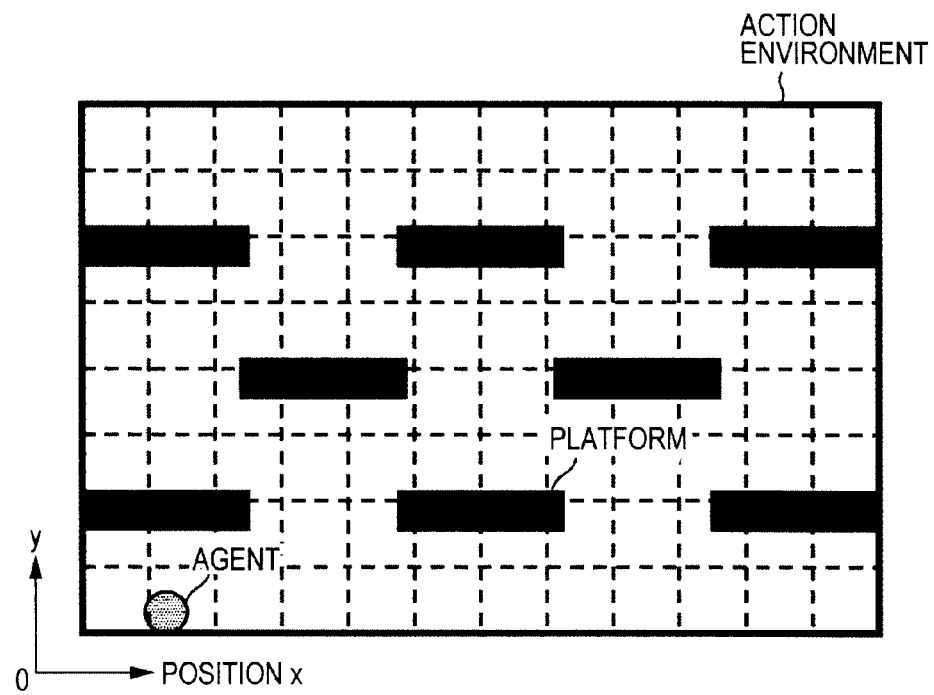
FIG. 3 is a diagram illustrating an action environment where the agent acts and an example of an action that the agent can perform.

FIG. 3 is a diagram illustrating examples of an action environment where the agent acts and an action that the agent can perform.

In FIG. 3, the action environment is a predetermined space (plane) defined with the x direction that is the right direction from the left and the y direction that is the upper direction from the bottom, and gravity acts in the lower direction (the opposite direction to the y direction).

In addition, in the action environment, the position of y=0 is the ground surface, and furthermore, there are provided platforms at several positions of y>0.

For the agent, the position (coordinate (x,y)), speed, and acceleration thereof are defined. The position, speed, and acceleration of the agent are continuous values.

In addition, as actions of the agent, an action $U_1$ increasing the acceleration of the agent by a predetermined value α to the right direction (x direction), an action $U_2$ increasing the acceleration to the left direction (the opposite direction to the x direction), and an action $U_3$ increasing the acceleration to the upper direction (y direction) are defined. Thus, an action U that the agent can perform is expressed with discrete values indicating the actions $U_1$, $U_2$, and $U_3$ in FIG. 3.

Furthermore, the action $U_3$ increasing the acceleration of the agent to the upper direction (y direction) can be performed only when the speed of the agent to the upper direction is zero.

In addition, since gravity acts in the action environment, when (the bottom) of the agent does not contact the ground surface or the platform, the swiftness (speed) of the agent toward the lower direction increases by a predetermined value V per unit time according to gravity.

The agent acts within the action environment as above, but an observation value that the agent observes is only the position of the agent, and knowledge on the action environment, that is, for example, the platforms, the ground surface, the position of a wall, information whether or not the agent collides with the platforms, or the like, and information of positions to be moved, or the like, is not given at all.

[State Transition Model]

Figure 4:
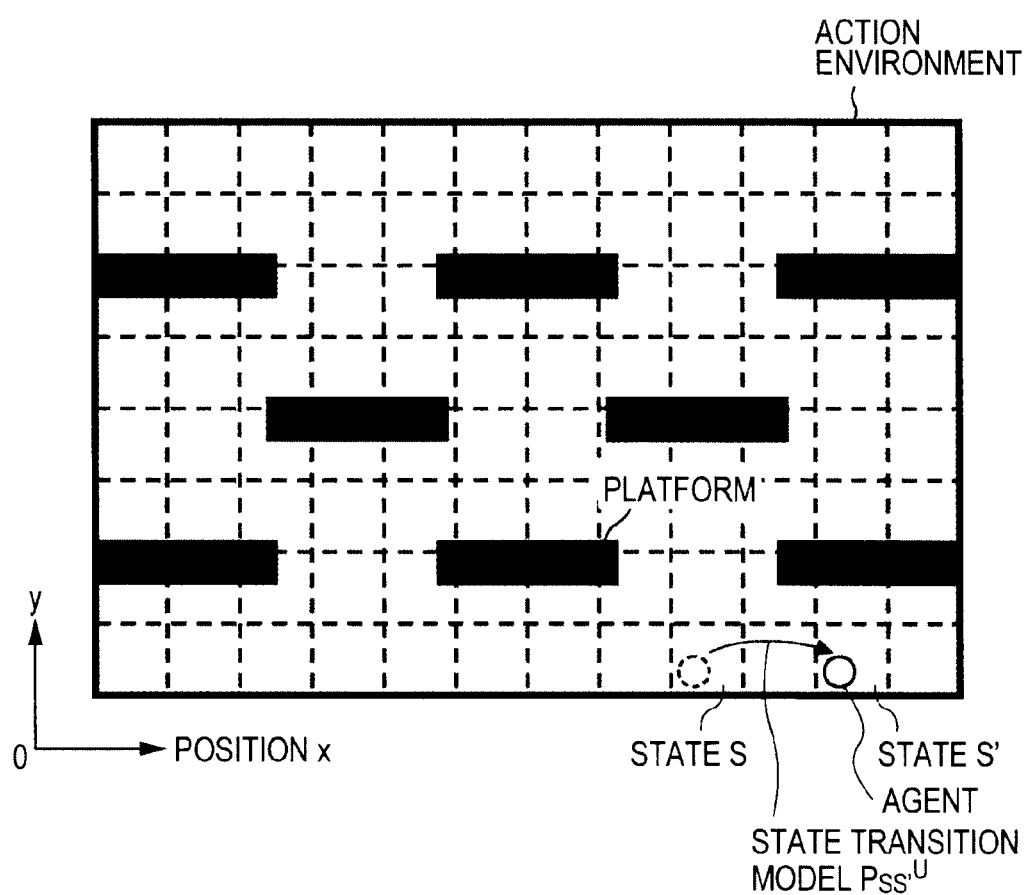
FIG. 4 is a diagram illustrating an example of a state transition model of the agent acting in the action environment.

FIG. 4 is a diagram illustrating an example of a state transition model of the agent acting in the action environment.

In FIG. 4, as the state of a state transition model of the agent acting in the action environment, a small area obtained by dividing the action environment into small areas is employed.

In other words, in FIG. 4, a small area in a square shape obtained by dividing the action environment with an equal interval respectively to the x direction and the y direction represents a state, and the state is expressed with a discrete value.

The agent observes the current position as an observation value, and can recognize the state of the current time (current state) from the current position.

A state transition model $P_{SS'}^{U}$ for each action indicates transition of the state of the agent from a state (first state) S to a state (second state (a state the same as or different from the state S)) S' by performing a predetermined action U.

The state transition model $P_{SS'}^{U}$ for the action U is expressed, for example, by Formula (1).

$$P_{SS'}^{U} = P(S'|S,U) \qquad \text{[Expression 1]}$$

In Formula (1) here, P(S'|S,U) indicates a transition probability (probability model) with which the state is transited to the state S' when the agent performs the action U in the state S.

Furthermore, as the state transition model $P_{SS'}^{U}$ for the action U, the frequency of transition to the state S' when the agent performs the action U in the state S can be employed.

The frequency of transition to the state S' by performance of the action U in the state S can be randomized to a transition probability of transition to the state S' by performance of the action U in the state S by normalizing to the sum of frequencies of transition to each state by performance of the action U in the state S.

Thus, the frequency of transition to the state S' by performance of the action U in the state S and the transition probability of transition to the state S' by performance of the action U in the state S can be regarded to be equivalent.

Furthermore, herein, the storage (learning) of the state transition model $P_{SS'}^{U}$ is performed with the frequency, the frequency is randomized to a transition probability in a process using the state transition model $P_{SS'}^{U}$ depending on necessity, and the transition probability is used.

In addition, hereinbelow, the state transition model $P_{SS'}^{U}$ indicating a transition probability is also described as a transition probability $P_{SS'}^{U}$.

[Configuration Example of Learning Unit 12]

Figure 5:
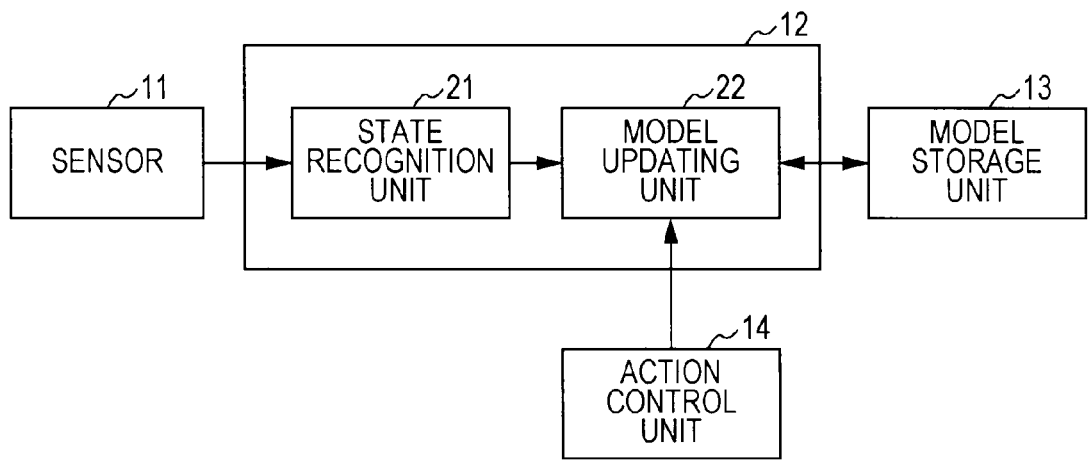
FIG. 5 is a block diagram showing a configuration example of a learning unit.

FIG. 5 is a block diagram showing a configuration example of the learning unit 12 of FIG. 2.

In FIG. 5, the learning unit 12 includes a state recognition unit 21 and a model updating unit 22.

The state recognition unit 21 is supplied with (the coordinate of) the current position of the agent from the sensor 11 as an observation value.

The state recognition unit 21 recognizes the current state which is a state where the coordinate is observed (herein, a small area where the agent is positioned among the small areas obtained by dividing the action area described in FIG. 4) based on the coordinate of the current position as the observation value from the sensor 11, and supplies the result to the model updating unit 22.

The model updating unit 22 recognizes the action U of the agent having a state transition to the (latest) current state from the state recognition unit 21 based on the action signal from the action control unit 14.

Then, the model updating unit 22 updates a state transition model $P_{SS'}^{U}$ for the action U of the agent having the state transition to the (latest) current state S' from the state recognition unit 21 among state transition models for each action stored in the model storage unit 13 based on the state transition to the current state S'.

In other words, the current state of immediately before (or one time before) the latest current state S' supplied from the state recognition unit 21 to the model updating unit 22 (hereinafter, also referred to as the previous state) is assumed to be a state S.

The model updating unit 22 recognizes the previous state S and the current state S' based on the current state supplied from the state recognition unit 21, and further recognizes the action U of the agent that is performed to bring about the state transition from the previous state S to the current state S' based on the action signal from the action control unit 14.

Then, the model updating unit 22 updates the state transition model $P_{SS'}^{\prime U}$ by increasing the frequency indicated by the state transition model $P_{SS'}^{\prime U}$ stored in the model storage unit 13 by one when the state transition to the current state S' is implemented by performance of the action U in the previous state S.

[Learning Process]

Figure 6:
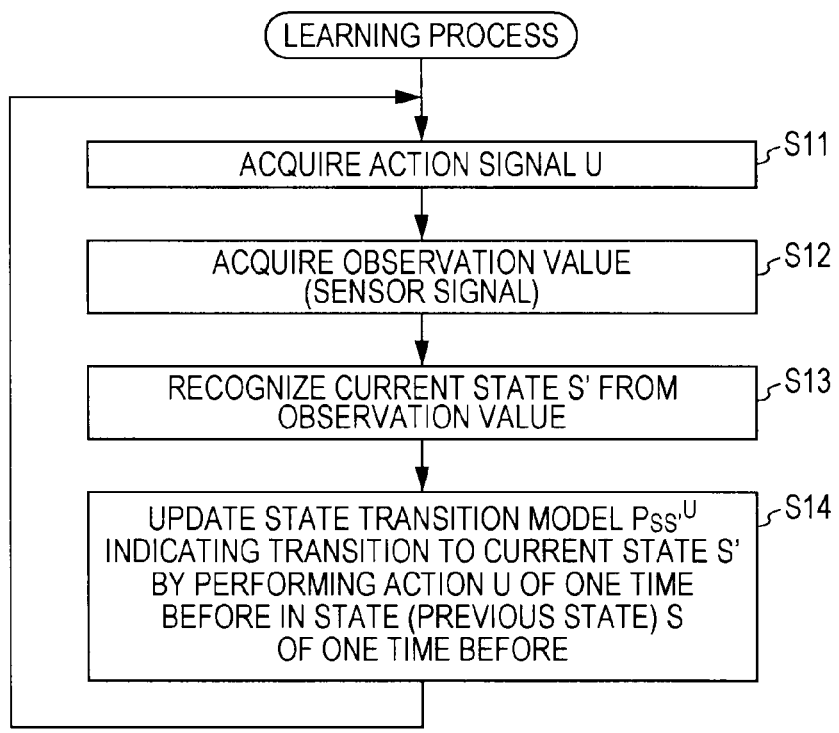
FIG. 6 is a flowchart illustrating a learning process.

FIG. 6 is a flowchart explaining a process of learning (learning process) of the state transition model performed by the learning unit 12 of FIG. 5.

Furthermore, the learning process of FIG. 6 is performed at all times while the agent performs actions.

In Step S11, the model updating unit 22 awaits the output of an action signal U from the action control unit 14 to acquire (receive) the action signal U, and recognizes an action U of the agent performed based on the action signal U, and the process advances to Step S12.

Herein, the action signal U is an action signal that causes the agent to perform the action U.

In Step S12, the state recognition unit 21 acquires an observation value (sensor signal) observed by the sensor 11 after the agent performs the action U corresponding to the action signal U previously output from the action control unit 14, and the process advances to Step S13.

In Step S13, the state recognition unit 21 recognizes the current state S' based on the observation value from the sensor 11, and supplies the result to the model updating unit 22, and the process advances to Step S14.

In Step S14, the model updating unit 22 updates the state transition model $P_{SS'}^{\prime U}$ indicating the state transition to the current state S' supplied from the state recognition unit 21 by performance of the action U one time before in the previous state S supplied from the state recognition unit 21 one time before, among the state transition models stored in the model storage unit 13.

In other words, the model updating unit 22 updates the state transition model $P_{SS'}^{\prime U}$ by increasing the frequency indicated by the state transition model $P_{SS'}^{\prime U}$ by one.

After the updating of the state transition model $P_{SS'}^{\prime U}$, the process returns to Step S11 from Step S14, and the same process is repeated thereafter after awaiting the output of the action signal from the action control unit 14.

[Configuration Example of Action Control Unit 14]

Figure 7:
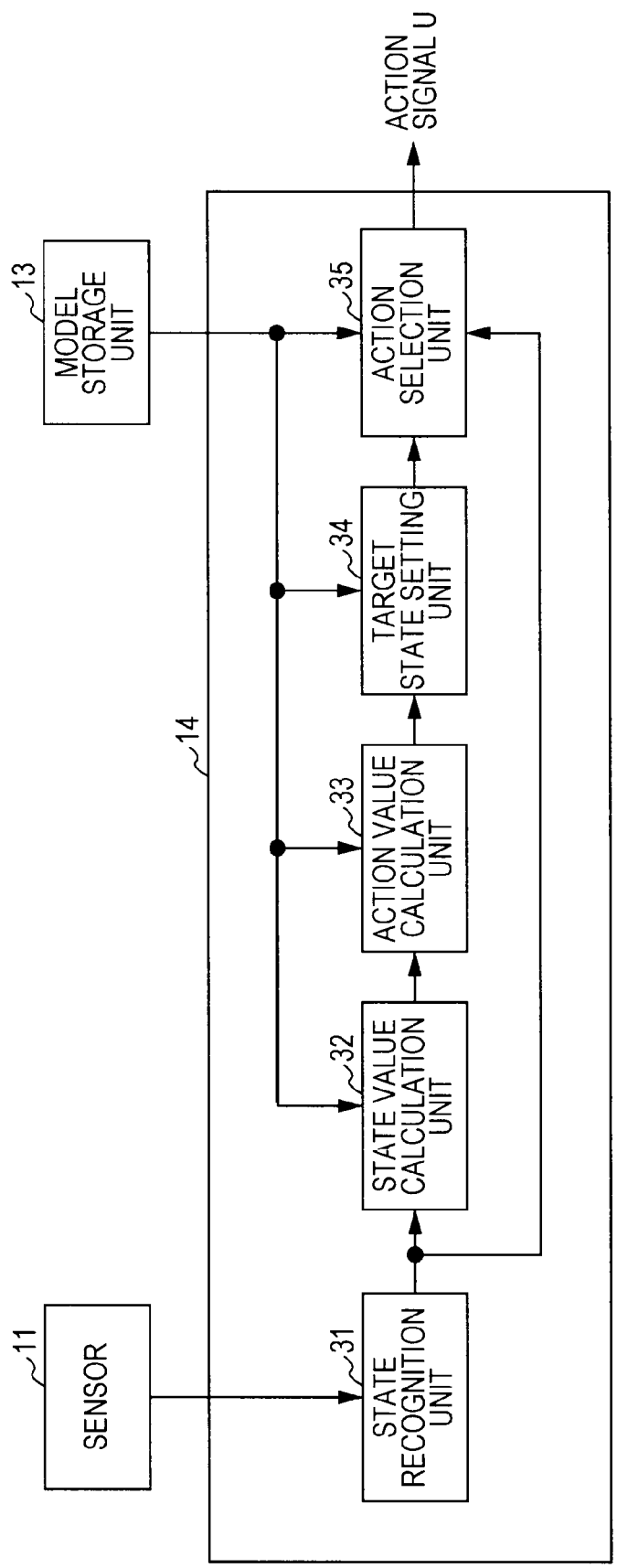
FIG. 7 is a block diagram showing a configuration example of an action control unit.

FIG. 7 is a block diagram showing a configuration example of the action control unit 14 of FIG. 2.

In FIG. 7, the action control unit 14 includes a state recognition unit 31, a state value calculation unit 32, an action value calculation unit 33, a target state setting unit 34, and an action selection unit 35.

The state recognition unit 31 is supplied with (the coordinate) of the current position of the agent as an observation value from the sensor 11.

The state recognition unit 31 recognizes the current state which is a state where the coordinate is observed (herein, a small area where the agent is positioned among the small areas obtained by dividing the action area described in FIG. 4) based on the coordinate of the current position as the observation value from the sensor 11 in the same manner as the state recognition unit 21 of FIGS. 5, and supplies the result to the state value calculation unit 32 and the action selection unit 35.

Furthermore, either of the state recognition unit 31 or the state recognition unit 21 of FIG. 5 can be used as a state recognition unit.

The state value calculation unit 32 calculates a state value having a predetermined state set as a reference of which value increases as much as a state where a transition probability to a state close to a predetermined state of the state transition model increases, for each state of state transition models based on the state transition model stored in the model storage unit 13, that is, each small area obtained by dividing the action area described in FIG. 4 here, and supplies the result to the action value calculation unit 33.

Specifically, the state value calculation unit 32 calculates a state value V(S) having the current state set as a reference as a predetermined state, for example, of which the value increases as much as the state S where a transition probability $P_{SS'}^{\prime U}$ to the state S' close to the current state from the state recognition unit 31 for each state S of the state transition model, and supplies the result to the action value calculation unit 33.

The action value calculation unit 33 calculates an action value Q(S,U) of which the value increases as much as the state S and the action U of which transition probability to the state S' with a high state value V(S') having the current state set as a reference, for each state S of the state transition model and each action U that the agent can perform based on the state transition models stored in the model storage unit 13 and the state value V(S) having the current state set as a reference from the state value calculation unit 32, and supplies the result to the target state setting unit 34.

The target state setting unit 34 sets a state with great unevenness in the action value Q(S,U) among states of the state transition models to a target state that is the target of the agent to reach by performance of actions based on the action value Q(S,U) from the action value calculation unit 33, and supplies the target state to the action selection unit 35.

The action selection unit 35 selects the action U of the agent so as to move toward the target state out of actions that the agent can perform based on the state transition models stored in the model storage unit 13 and the target state from the target state setting unit 34, and outputs the action signal U corresponding to the action U (action signal U that causes the agent to perform the action U).

The action signal U output by the action selection unit 35 is supplied to the learning unit 12 and the actuator 15 (in FIG. 2).

[Process of State Value Calculation Unit 32]

Figure 8:
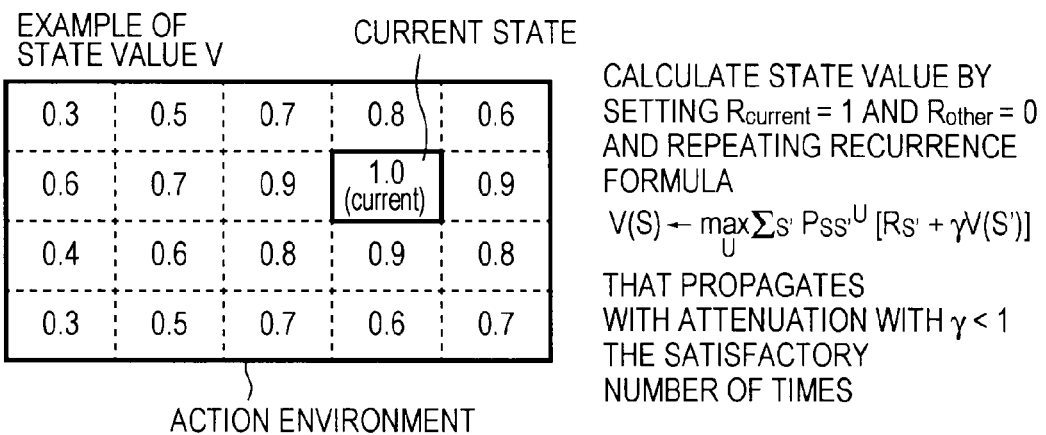
FIG. 8 is a diagram illustrating a process of a state value calculation unit.

FIG. 8 is a diagram illustrating the process of the state value calculation unit 32 of FIG. 7.

The state value calculation unit 32 calculates the state value V(S) having the current state set as a reference of which the value increases as much as the state S with a high transition probability $P_{SS'}^{\prime U}$ to the state S' close to the current state from the state recognition unit 31 for each state S of the state transition models.

In other words, the state value calculation unit 32 calculates the state value V(S) having the current state set as a reference for each state S of the state transition models by repeatedly calculating the recurrence formula of Formula (2), for example, which propagates a state value V ($S_{current}$) with attenuation the (satisfactory) number of times in advance, setting the state value V($S_{current}$) of the current state $S_{current}$ to 1(1.0).

$$V(S) \leftarrow \max_{U} \sum_{S'} P_{SS'}^{U} [R_{S'} + \gamma V(S')] \quad \text{[Expression 2]}$$

Herein, in Formula (2), $\Sigma_{S'}$ indicates having a summation of all states S', and max indicates the maximum value among values right after max, which is obtained for each action U.

Furthermore, in Formula (2), γ is an attenuation constant of a real number within the range of 0<γ<1 for propagating the state value $V(S_{current})$ of the current state $S_{current}$ with attenuation, and determined in advance.

In addition, in Formula (2), $R_{S'}$ indicates a constant set for the state S' (of the transition destination of the state transition). If a constant $R_{S'}$ when the state S' is the current state indicates $R_{current}$, and a constant $R_{S'}$ when the state S' is other than the current state indicates $R_{other}$, the constant $R_{current}$ is 1 and the constant $R_{other}$ is 0.

According to the recurrence formula of Formula (2), when the transition probability $P_{SS'}^{'U}$ is high, when the state value V(S') of the transition destination is high, and when the state S' of the transition destination is the current state ($R_{S'}=R_{current}$), the state value V(S) of the state S of the transition destination increases. In other words, the value of the state value V(S) having the current state set as a reference increases as much as the state S with the high transition probability $P_{SS'}^{'U}$ to the state S' close to the current state.

Herein, FIG. 8 shows an example of the state value V(S) having the current state set as a reference.

When a state is set to a small area obtained by dividing the action area as described in FIG. 4, the closer the small area as the current state is to a small area, the easier it is for the small area to move to a small area as the current state (the transition probability $P_{SS'}^{'U}$ is high), and therefore, the value of the state value V(S) having the current state set as a reference tends to increase as the state is close to the current state in FIG. 8.

Furthermore, in FIG. 8, the state value calculation unit 32 is set to calculate the state value V(S) having the current state set as a reference, but the state value calculation unit 32 can calculate the state value V(S) having an arbitrary state other than the current state (for example, a state selected at random) set as a reference.

In addition, the recurrence formula of Formula (2) is calculated with an assumption that the initial value of V(S) is 0 (in the same manner for a recurrence formula to be described later) unless specified otherwise.

[Process of Action Value Calculation Unit 33 and Target State Setting Unit 34]

Figure 9:
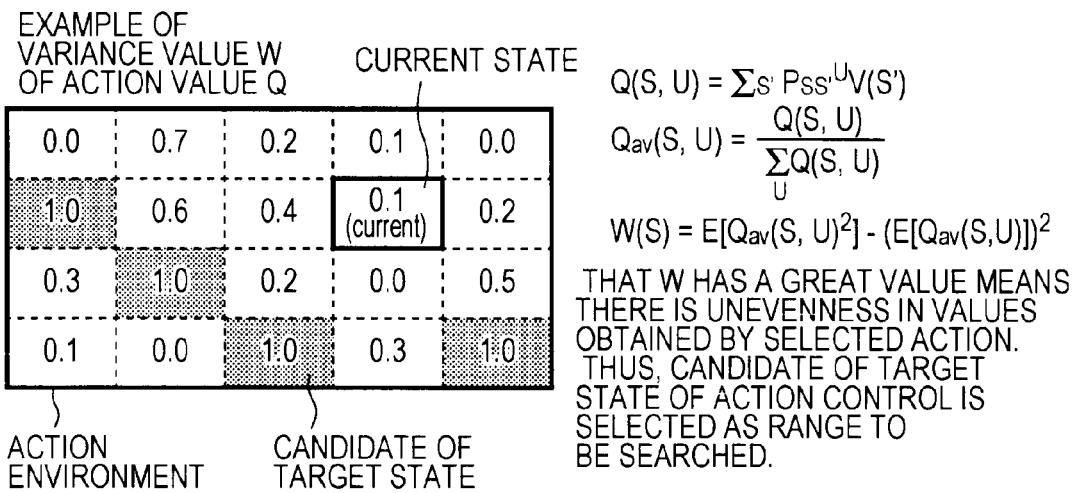
FIG. 9 is a diagram showing an example of a variance and an action value obtained for each small area obtained by partitioning an action area as a state.

FIGS. 9 and 10 are diagrams illustrating the process of the action value calculation unit 33 and the target state setting unit 34 of FIG. 7.

The action value calculation unit 33 calculates an action value Q(S,U) of which the value increases as much as the action U and the state S with a high transition probability to the state S' with a high state value V(S') having the current state set as a reference for each state S of the state transition models and each action U that the agent can perform based on the state transition models stored in the model storage unit 13 and the state value V(S) having the current state set as a reference from the state value calculation unit 32.

In other words, the action value calculation unit 33 calculates an action value Q(S,U) for each state S of the state transition models and each action U that the agent can perform by calculating, for example, Formula (3) using the transition probability (state transition model) $P_{SS'}^{'U}$ and the state value V(s) having the current state set as a reference.

$$Q(S,U) = \Sigma_{S} P_{SS'}^{U} V(S') \quad \text{[Expression 3]}$$

According to Formula (3), the value of the action value Q(S,U) increases as much as the action U and the state S with a high transition probability $P_{SS'}^{'U}$ to the state S' with a high state value V(S') having the current state set as a reference.

The action value calculation unit 33 supplies each state S and the action value Q(S,U) for each action U to the target state setting unit 34.

The target state setting unit 34 sets a state with large unevenness in the action value Q(S,U) to the target state among the states of the state transition models based on the action value Q(S,U) from the action value calculation unit 33.

In other words, the target state setting unit 34 obtains, for example, a variance W(S) as unevenness in the action value Q(S,U) for each state S according to Formulas (4) and (5) based on the action value Q(S,U) from the action value calculation unit 33.

$$Q_{av}(S, U) = \frac{Q(S, U)}{\sum_{U} Q(S, U)} \quad \text{[Expression 4]}$$

$$W(S) = E[Q_{av}(S, U)^2] - (E[Q_{av}(S, U)])^2 \quad \text{[Expression 5]}$$

Herein, $Q_{av}(S,U)$ indicates a probability (random variable) obtained by randomizing an action value Q(S,U) for the state S, and Σ of Formula (4) indicates summation of actions U.

In addition, in Formula (5), E[ ] indicates an expectation value of a value (probability variable) in the parenthesis [ ].

When the variance W(S) for the state S is high, unevenness in the action value Q(S,U) of the action U performed in the state S is great, and thus, it is highly possible that there is an action that the agent has not performed in the state S, and further, it is highly possible that the agent also has little experience of reaching the state S (the state S reaches the current state).

In addition, it is highly possible that learning (updating) of a state transition model is insufficient for the state S that the agent has little experience of reaching.

Furthermore, for a state where transition only from the state S that the agent has little experience of reaching is possible, there is not only a possibility that learning of the state transition model is insufficient but also a probability of being a state that the agent has little experience of reaching.

On the other hand, since the agent reaches the state S that the agent has little experience of reaching or a state that the agent has no experience of reaching, and then performs learning (updating) of a state transition model (in FIG. 6) for the states, it is possible to efficiently learn an action environment that is an unknown environment.

Thus, when the target state setting unit 34 obtains a variance W(S) as unevenness of the action value Q(S,U) for each state S, the target state setting unit selects a state with a high variance W(S), that is, a state of which a variance W(S) is equal to or higher than a predetermined threshold value as a candidate of the target state.

FIG. 9 shows an example of the variance W(S) of the action value Q(S,U) obtained for each small area obtained by dividing the action area as a state.

In FIG. 9, as the predetermined threshold value, for example, 1 is employed to select the candidates of the target states.

The target state setting unit 34 sets the target state from the candidates of the target states, after the selection of the candidates of the target states.

As a method of setting the target state from the candidates of the target states, for example, there are methods of selecting one candidate among the candidates of the target states at random and setting the candidates to the target state, and of setting a candidate with the maximum variance W(S) to the target state.

However, in the methods of setting to the target state by selecting one candidate among the candidates of the target states and of setting the candidate with the maximum variance W(S) to the target state, it may be difficult to reach the target state from the current state.

Thus, the target state setting unit 34 sets a candidate to reach from the current state to the target state among the candidates of the target states by state transitions within a predetermined number of times.

In other words, the target state setting unit 34 obtains an existence probability T(S) of being in (or reaching) the current state by the state transitions within a predetermined number of times for each state S based on the state transition model $P_{SS'}^{\prime U}$ stored in the model storage unit 13 by repeatedly calculating, for example, the recurrence formula of Formula (6) a predetermined number of times.

$$T(S) \leftarrow \max_U \sum_{S'} P_{SS'}^U T(S') \quad \text{[Expression 6]}$$

In Formula (6) here, if it is assumed that the initial value of an existence probability T(S') of the current state is indicated by $T_{current}$ and the initial value of the existence probability T(S') of a state other than the current state is indicated by $T_{other}$ the initial value $T_{current}$ is 1, and the initial value $T_{other}$ is 0.

FIG. 10 shows an example of the existence probability T(S) obtained for each small area obtained by dividing the action area as a state.

A state where the existence probability T(S) is greater than 0 is a state that can be reached from the current state by state transitions within a predetermined number of times (hereinbelow, referred to as a reachable state), and the target state setting unit 34 selects a reachable state among the candidates of the target states, for example, at random, and sets it to the target state.

As described above, since a state with a high variance W(S) of the action value Q(S,U) for each state S is set to the target state in the target state setting unit 34, it is easy for the agent to reach a state that the agent has little experience of reaching and a state that the agent has no experience of reaching by performing actions so as to reach such a target state, it is possible to efficiently learn the action environment that is an unknown environment with learning (updating) of a state transition model for the states.

As described above, herein, the target state set based on the variance W(S) of the action value Q(S,U) in the target state setting unit 34 is a state set for efficiently learning the action environment that is an uncharged environment by making the agent easily reach the state with little experience of reaching and the state with no experience of reaching (in other words, by making the agent easily accumulate unknown experience), and hereinbelow also referred to also as a learning target state.

[Process of Action Selection Unit 35]

Figure 12:
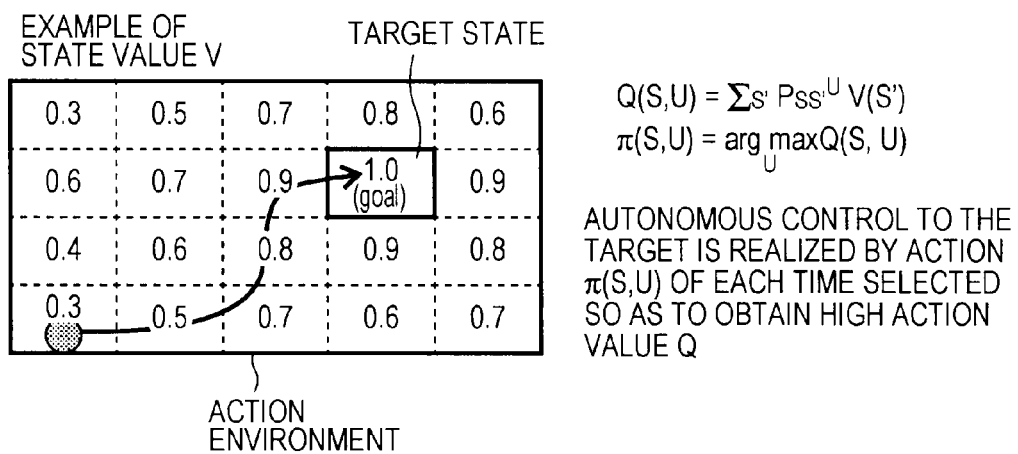
FIG. 12 is a diagram showing the state where the agent goes toward the target state.

FIGS. 11 and 12 are diagrams illustrating a process of the action selection unit 35 of FIG. 7.

The action selection unit 35 selects an action U of the agent so as to move toward the target state among actions that the agent can perform based on the state transition models stored in the model storage unit 13 and the target state from the target state setting unit 34, and outputs an action signal U corresponding to the action U (action signal U that causes the agent to perform the action U).

In other words, the action selection unit 35 calculates a state value V(S) having the target state set as a reference of which the value increases as much as the state S with a high transition probability $P_{SS'}^{\prime U}$ to the state S' close to the target state from the target state setting unit 34 for each state S of the state transition model.

Specifically, the action selection unit 35 calculates the state value V(S) having the target state set as a reference for each state S of the state transition models by repeatedly calculating the recurrence formula of Formula (2), for example, which propagates a state value $V(S_{goal})$ with attenuation the (satisfactory) number of times in advance, setting the state value $V(S_{goal})$ of the current state $S_{goal}$ to 1(1.0), in the same manner as the state value calculation unit 32 (in FIG. 7).

Furthermore, according to Formula (2), when the state value V(S) having the target state set as a reference is to be calculated, as a constant $R_{S'}$ of Formula (2), 1 is used for the target state, and 0 is used for a state other than the target state.

In other words, in Formula (2), if it is assumed that the constant $R_{S'}$ when the state S' is the target state is indicated by $R_{goal}$ and the constant $R_{S'}$ when the state S' is a state other than the target state is indicated by $R_{other}$, the constant $R_{goal}$ is 1 and the constant $R_{other}$ is 0.

According to the recurrence formula of Formula (2), when the transition probability $P_{SS'}^{\prime U}$ is high, when the state value V(S') as the transition destination is high, and when the state S' as the transition destination is the target state ($R_{S'}=R_{goal}$), the state value V(S) of the state S as the transition destination increases. In other words, the value of the state value V(S) having the target state set as a reference increases as much as the state S with a high transition probability $P_{SS'}^{\prime U}$ to the state S' close to the target state.

Herein, FIG. 11 shows an example of the state value V(S) having the target state set as a reference.

After the calculation of the state value V(S) having the target state set as a reference, the action selection unit 35 calculates the action value Q(S,U) of which the value increases as much as the action U and the state S with the high transition probability $P_{SS'}^{\prime U}$ to the state S' with the state value V(S) having the target state set as a reference for each state S of the state transition model and each action U that the agent can perform, based on the state value V(S) and the state transition models stored in the model storage unit 13.

In other words, the action selection unit 35 calculates the action value Q(S,U) for each state S of the state transition model and each action U that the agent can perform by calculating, for example, the above-described Formula (3) using the transition probability (state transition model) $P_{SS'}^{\prime U}$ and the state value V(S) having the target state set as a reference.

According to Formula (3), the value of the action value Q(S,U) increases as much as the action U and the state S with a high transition probability $P_{SS'}^{\prime U}$ to the state S' with a high state value V(S') having the target state set as a reference.

When the action value Q(S,U) is obtained for each state S and each action U, the action selection unit 35 selects an action U that gives the maximum value among the action value Q(S,U) for the current state S from the state recognition unit 31 as an action π(S,U) performed in the current state S according to, for example, Formula (7).

$$\pi(S, U) = \underset{U}{\mathrm{argmax}} Q(S, U) \qquad \text{[Expression 7]}$$

Herein, in Formula (7), argmax indicates an action U that gives the maximum value among action values Q(S,U) for the current state S (action U of the maximum action value Q(S, U).

The action selection unit 35 repeats selecting the action U that gives the maximum value among the action values Q(S, U) for the current state S as the action π(S,U) performed in the current state S every time the current state S is supplied from the state recognition unit 31, and as a result, the agent performs actions so as to move toward the target state.

FIG. 12 shows the state where the agent moves toward the target state by repeating the action U=π(S,U) that gives the maximum value among the action values Q(S,U) for the current state S.

Furthermore, the target state setting unit 34 can set the above-described learning target state as a target state, and can set a state given from the outside based on, for example, the operation of a user, or the like.

Herein, the state given from the outside as a target state is a state given in order to make the agent autonomously act until the agent reaches the state, and hereinbelow, the state is referred to also as an action target state, in order to discriminate from the learning target state.

When the target state supplied from the target state setting unit 34 to the action selection unit 35 is the action target state, the action selection unit 35 can select the action U that gives the maximum value among the action values Q(S,U) for the current state S as the action π(S,U) performed in the current state S as described above.

On the other hand, when the target state supplied from the target state setting unit 34 to the action selection unit 35 is the learning target state, the action selection unit 35 can select the action U that gives the maximum value among the action values Q(S,U) for the current state S as the action π(S,U) performed in the current state S, and can select the action π(S,U) performed in the current state S based on the action value Q(S,U) in the current state S by, for example, a ϵ-greedy method.

In the ϵ-greedy method, the action U that gives the maximum value among the action values Q(S,U) for the current state S with a certain probability 1-ϵ is selected as the action π(S,U) performed in the current state S, and one of actions performed by the agent with a probability ϵ is selected as the action π(S,U) performed in the current state S at random according to Formula (8).

$$\pi(S, U) = \begin{cases} \underset{U}{\mathrm{argmax}} Q(S, U) & (\text{random} < 1 - \varepsilon) \\ \mathrm{random}(U) & (\text{random} < \varepsilon) \end{cases} \qquad \text{[Expression 8]}$$

Furthermore, when the target state supplied from the target state setting unit 34 to the action selection unit 35 is the learning target state, the action selection unit 35 can select the action π(S,U) performed in the current state S based on, for example, the action value Q(S,U) for the current state S by a softmax method, in addition to the above.

In the softmax method, each action U is selected as the action π(S,U) performed in the current state S at random with a probability corresponding to the action value Q(S,U) of each action U for the current state S.

[Action Control Process]

Figure 13:
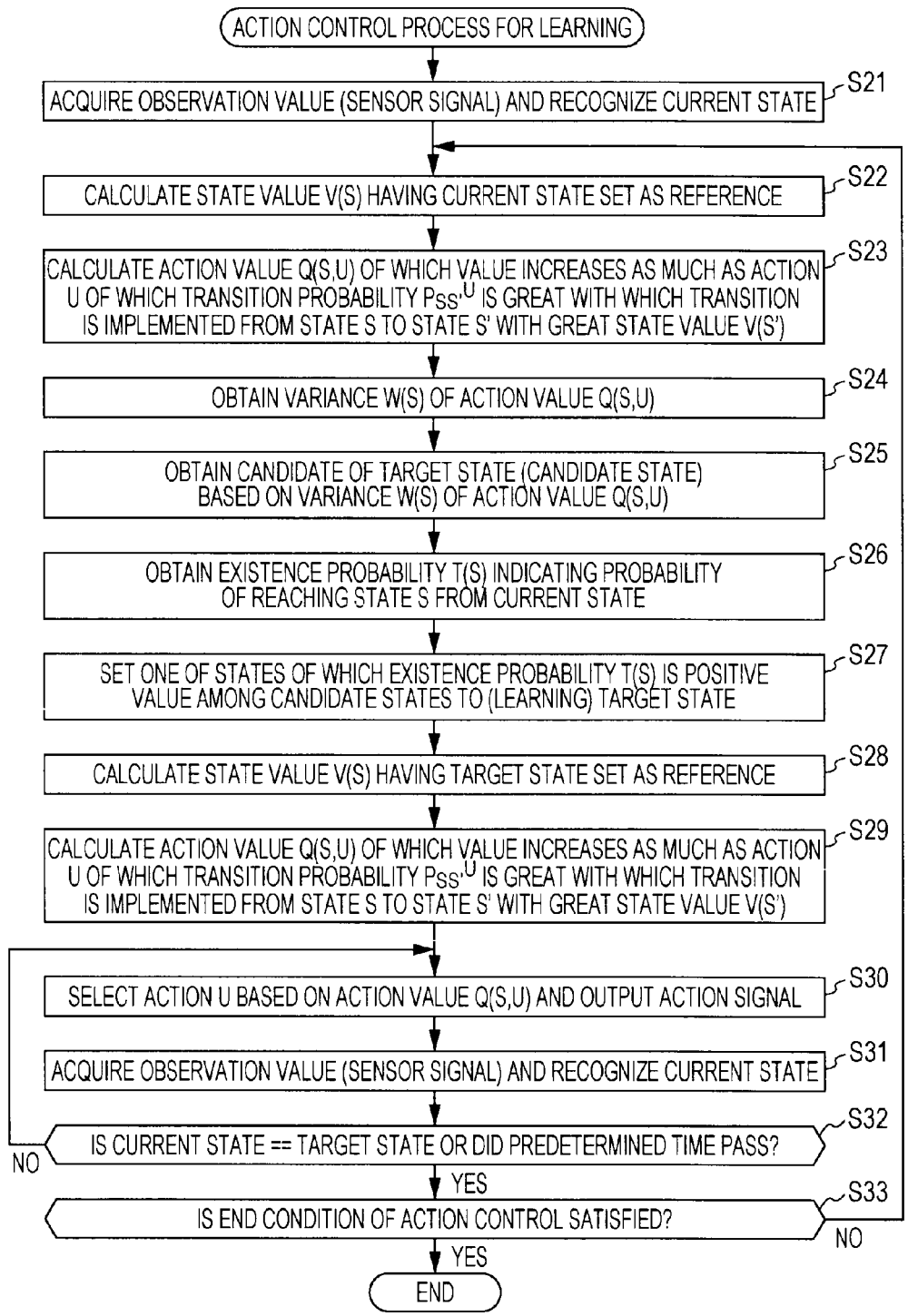
FIG. 13 is a flowchart explaining an action control process for learning.

FIG. 13 is a flowchart explaining a process of action control of the agent for learning the action environment (action control process for learning) performed by the action control unit 14 of FIG. 7.

In the action control process for learning, in order to proceed learning (updating) of the state transition models stored in the model storage unit 13, in other words, in order to learn the entire unknown action environment, a state with a high possibility that the agent has little experience of reaching is set to the learning target state, and actions of the agent are controlled so as to move toward the learning target state.

Furthermore, the agent performs innate actions performed in compliance with a rule determined, for example, at random or in advance before the agent performs the action control process for learning in FIG. 13 for the first time, and performs a certain degree of learning for the action environment by the learning process (in FIG. 6) performed between the innate actions.

Accordingly, the agent acquires a state transition model (state transition model indicating the frequency that is not 0) within the range of a state that the agent has reached by the innate actions before the agent performs the action control process for learning for the first time.

In Step S21, the state recognition unit 31 awaits the output of an observation value (sensor signal) observed after the agent performed an action corresponding to the action signal previously output by the action selection unit 35 from the sensor 11, and acquires the observation value.

Furthermore, the state recognition unit 31 recognizes the current state based on the observation value from the sensor 11, and supplies the result to the state value calculation unit 32 and the action control unit 35, and the process advances from Step S21 to Step S22.

In Step S22, the state value calculation unit 32 calculates a state value V(S) having the current state set as a reference for each state S of state transition models using the state transition model $P_{SS'}{}^{U}$ according to the recurrence formula of the above-described Formula (2), and supplies the result to the action value calculation unit 33, and the process advances to Step S23.

In Step S23, the action value calculation unit 33 calculates an action value Q(S,U) for each state S of the state transition models and each action U that the agent can perform based on the state value V(S) from the state value calculation unit 32 having the current state set as a reference according to the above-described Formula (3), and supplies the result to the target state setting unit 34, and the process advances to Step S24.

In Step S24, the target state setting unit 34 obtains a variance W(S) of the action value Q(S,U) for each state S based on the action value Q(S,U) from the action value calculation unit 33 according to the above-described Formulas (4) and (5), and the process advances to Step S25.

In Step S25, the target state setting unit 34 obtains candidates of the target states (candidate states), that is, selects a state of which the variance W(S) of the action value Q(S,U) is equal to or higher than a predetermined threshold value as a candidate of the target state, based on the variance W(S) of the action value Q(S,U), and the process advances to Step S26.

In Step S26, the target state setting unit 34 obtains an existence probability T(S) of being in (or reaching) the current state for each state S by a state transition within a predetermined number of times based on the state transition models $P_{SS'}{}^{U}$ stored in the model storage unit 13 according to the recurrence formula of the above-described Formula (6), and the process advances to Step S27.

In Step S27, the target state setting unit 34 selects one of states (reachable states) of which the existence probability T(S) is greater than 0 (has a positive value) out of the candidates of the target states, for example, at random, and sets the result to the learning target state.

Then, the target state setting unit 34 supplies the learning target state to the action selection unit 35, and the process advances from Step S27 to Step S28.

In Step S28, the action selection unit 35 calculates a state value V(S) having the learning target state from the target state setting unit 34 set as a reference for each state S of the state transition models according to the recurrence formula of the above-described Formula (2), and the process advances to Step S29.

In Step S29, the action selection unit 35 uses the state value V(S) having the learning target state set as a reference to calculate an action value Q(S,U) for each state S of the state transition models and each action U that the agent can perform according to the above-described Formula (3), and the process advances to Step S30.

In Step S30, the action selection unit 35 selects an action U performed in the current state S based on the action value Q(S,U) for the current state S from the state recognition unit 31 among the action values Q(S,U) for each state S of the state transition models and each action U that the agent can perform by, for example, the $\epsilon$-greedy method or the softmax method, and outputs an action signal U corresponding thereto.

The action signal U output by the action selection unit 35 is supplied to the learning unit 12 and the actuator 15.

The learning unit 12 performs the above-described learning process (in FIG. 6) using the action signal U from the action selection unit 35.

In addition, the actuator 15 is driven according to the action signal U from the action selection unit 35, and accordingly, the agent performs the action U according to the action signal U.

When the agent performs the action U according to the action signal U, the process advances from Step S30 to Step S31, and the state recognition unit 31 awaits the output of an observation value observed after the action U of the agent from the sensor 11, and acquires the observation value.

Furthermore, the state recognition unit 31 recognizes the current state based on the observation value from the sensor 11, and supplies the result to the state value calculation unit 32 and the action selection unit 35, and the process advances from Step S31 to Step S32.

In Step S32, the action selection unit 35 determines whether or not the current state from the state recognition unit 31 coincides with the (latest) learning target state from the target state setting unit 34 and whether or not a predetermined time t1 passed after the (latest) learning target state is supplied from the target state setting unit 34.

In Step S32, when it is determined that the current state from the state recognition unit 31 does not coincide with the learning target state from the target state setting unit 34 and that the predetermined time t1 did not pass after the learning target state is supplied from the target state setting unit 34, the process returns to Step S30, and thereafter, the same process is repeated.

In addition, in Step S32, when it is determined that the current state from the state recognition unit 31 coincides with the learning target state from the target state setting unit 34, that is, when the agent reaches the learning target state, or that the predetermined time t1 passed after the learning target state is supplied from the target state setting unit 34, that is, when the agent was not able to reach the learning target state for the predetermined time t1, the process advances to Step S33, and the action selection unit 35 determines whether or not the condition of ending the action control to end the action control process for learning is satisfied.

Herein, as the condition of ending the action control to end the action control process for learning, for example, there is a command performed so as to end the action control process for learning by a user, passage of a predetermined time t2 which is sufficiently longer than the predetermined time t1 after the action control process for learning is started, or the like.

In Step S33, when it is determined that the condition of ending the action control is not satisfied, the process returns to Step S22, and thereafter, the same process is repeated.

In addition, in Step S33, when it is determined that the condition of ending the action control is satisfied, the action control unit 14 ends the action control process for learning.

As described above, the agent calculates the state value V(S) having a predetermined state such as the current state set as a reference using the state transition model $P_{SS'}{}^{U}$ calculates the action value Q(S,U) for each state of the state transition model and each action U that the agent can perform based on the state value V(S), sets the state S with a high variance W(S) as unevenness in the action value Q(S,U) to the learning target state, and performs actions toward the learning target state.

As described above, it is a high possibility that the state S with a high variance W(S) as unevenness in the action value Q(S,U) is a state that the agent has little experience of reaching, and that learning (updating) of the state transition model is insufficient for such a state S.

Furthermore, for a state to be transited only from the state S that the agent has little experience of reaching, there is also a possibility that learning of the state transition model is insufficient, and the state is a state that the agent has no experience of reaching.

Accordingly, by setting, in the agent, the state S with the high variance W(S) of the action value Q(S,U) to the learning target state and performing actions toward the learning target state, the agent reaches (or tends to reach) the state that the agent has little experience of reaching and the state that the agent has no experience of reaching, and as a result, learning (updating) of the state transition model is performed for such a state, and therefore, it is possible to thoroughly learn the entire action environment with efficiency.

In other words, the agent performs movement actions thoroughly within the action environment, and as a result, the agent can efficiently learn the entire action environment.

Figure 14:
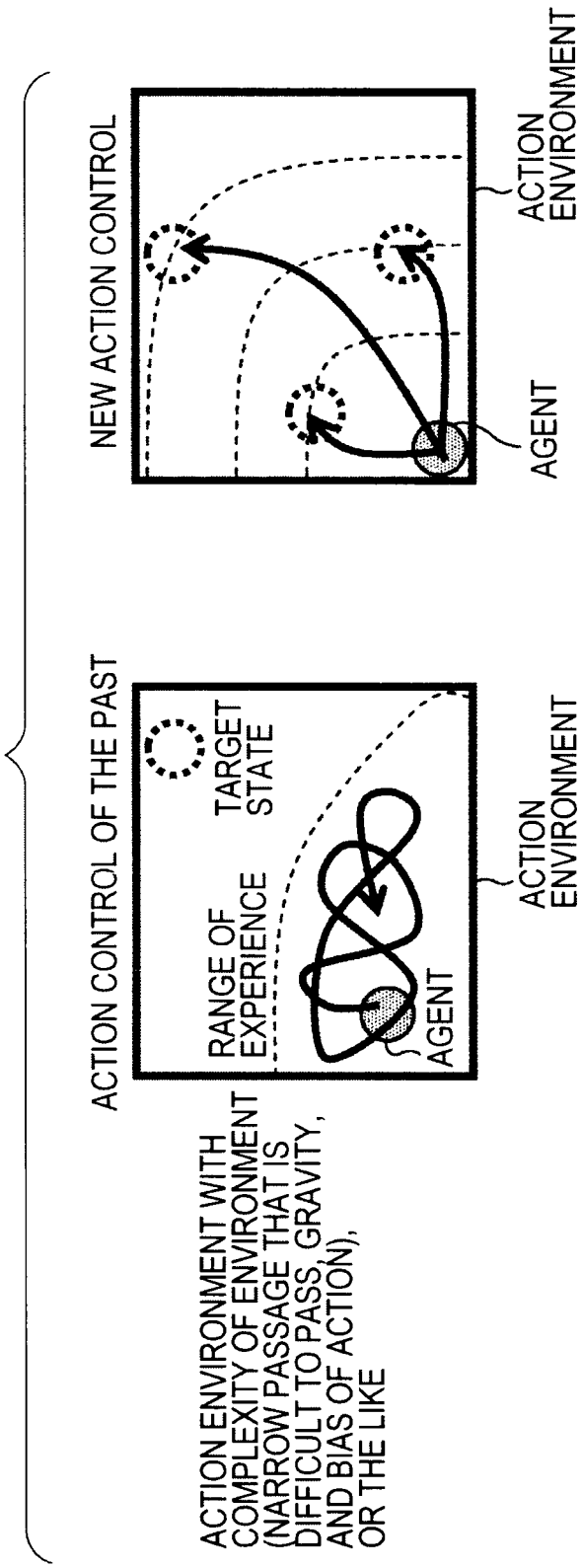
FIG. 14 is a diagram illustrating an action of the agent in an action environment.

FIG. 14 is a diagram illustrating an action in the action environment by the agent of FIG. 2 which is performed by the action control process for learning in FIG. 13.

In the action control of the past, the time when the action control based on an action value is possible is after the agent reaches the target state, and an action value for reaching the target state is calculated with reinforcement learning, and thus, the agent has to perform actions, for example, selected at random among actions that the agent can perform until the agent reaches the target state.

In addition, for the agent performing the action selected at random, it is difficult to reach the target state, that is, to perform learning to reach the target state, due to the complexity of the unknown action environment, or the like.

In other words, for example, when there is a narrow passage which is difficult for the agent to pass through in the action environment, the agent performing the actions selected at random is not able to pass through the narrow passage, and not able to learn the environment after passing through the narrow passage.

In addition, for example, when gravity is set in an action environment where the agent can move to the upper and lower side, it is difficult for the agent performing the actions selected at random to move in the upper side in the action environment due to gravity, and the agent is not able to learn the environment in the upper side in the action environment.

Furthermore, for example, there is a bias in actions performed by the agent performing the actions selected at random, a bias may occur also in learning of the action environment.

On the other hand, according to action control (new action control) by the action control process (in FIG. 13) for learning, since the state S with a high variance W(S) of the action value Q(S,U) is set to the learning target state, the agent reaches (or tends to reach) the state in which the agent has little experience of reaching and the state that the agent has no experience of reaching, and as a result, learning (updating) of the state transition model is performed for such a state, and therefore, it is possible to thoroughly learn the entire action environment with efficiency.

Figure 15:
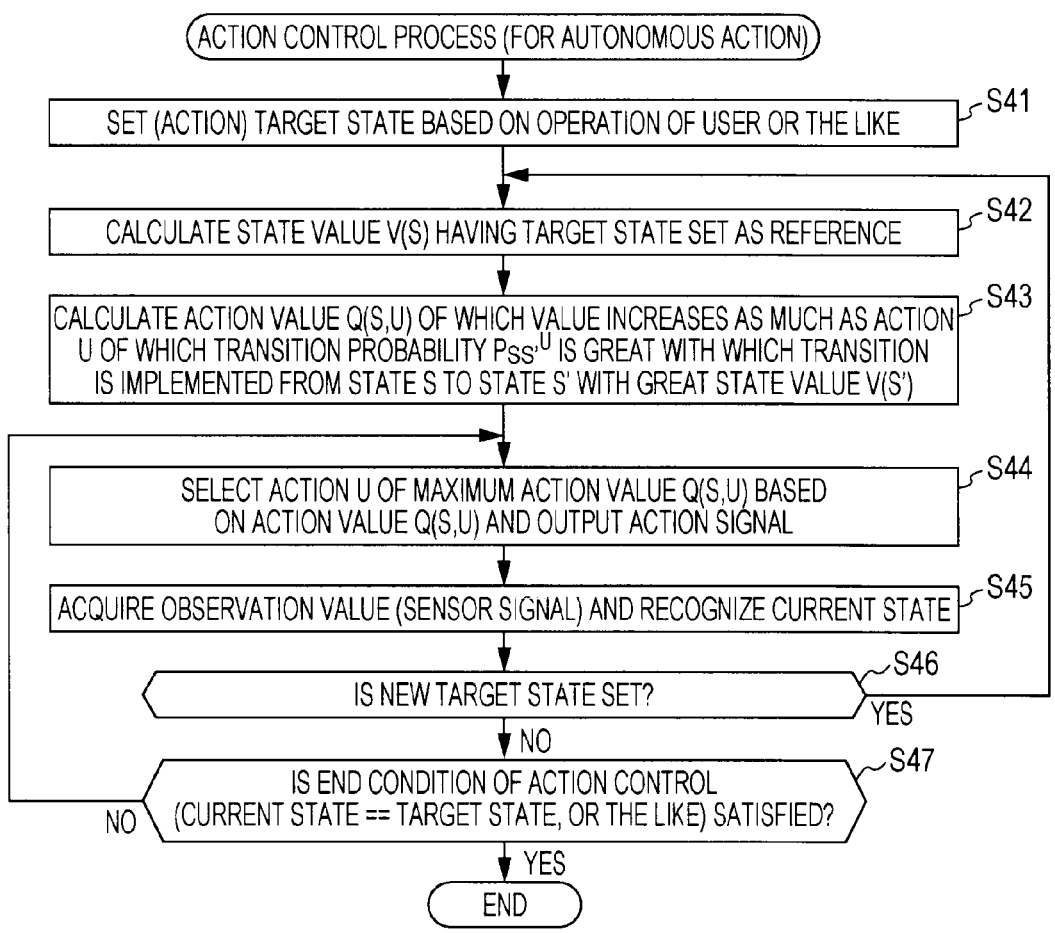
FIG. 15 is a flowchart explaining an action control process for an autonomous action.

FIG. 15 is a flowchart explaining a process of action control of the agent for autonomously acting in the action environment (action control process for autonomous actions) performed by the action control unit 14 of FIG. 7.

In the action control process for autonomous actions, the state given from the outside based on, for example, an operation of a user is set to the action target state, or the like, and the action of the agent is controlled so as to be toward the action target state.

In Step S41, the target state setting unit 34 sets the state given from the outside based on, for example, an operation of a user is set to the action target state, and supplies the result to the action selection unit 35.

Herein, as the action target state, a state that the agent has reached is set. By the action control process for learning (in FIG. 13), when learning of the entire action environment ends, that is, when the agent has reached all states of the action environment, an arbitrary state of the action environment can be set as the action target state.

In Step S41, furthermore, the state recognition unit 31 recognizes the current state based on the observation value from the sensor 11, and supplies the result to the action selection unit 35, and the process advances to Step S42.

In Step S42, the action selection unit 35 calculates the state value V(S) having the action target state from the target state setting unit 34 for each state S of the state transition models using the state transition model $P_{SS'}^{U}$ according to the recurrence formula of the above-described Formula (2), and the process advances to Step S43.

In Step S43, the action selection unit 35 calculates an action value Q(S,U) for each state S of the state transition models and each action U that the agent can perform using the state value V(S) having the action target state set as a reference according to the above-described Formula (3), and the process advances to Step S44.

In Step S44, the action selection unit 35 selects an action U which gives the maximum value among action values Q(S,U) for the current state S based on the action value Q(S,U) from the state recognition unit 31 for the current state S among the action values Q(S,U) for each state S of the state transition models and each action U that the agent can perform to the action π(S,U) performed in the current state S, and outputs an action signal U corresponding thereto.

The action signal U output from the action selection unit 35 is supplied to the learning unit 12 and the actuator 15.

The actuator 15 is driven according to the action signal U from the action selection unit 35, and accordingly, the agent performs the action U (=π(S,U)) according to the action signal U.

Furthermore, even while the action control process for autonomous actions is performed, the above-described learning process (in FIG. 6) can be performed in the learning unit 12 using the action signal U from the action selection unit 35 in the same manner as the action control process for learning (in FIG. 13).

When the agent performs the action U according to the action signal U, the process advances from Step S44 to Step S45, and the state recognition unit 31 awaits the output of the observation value observed after the action U of the agent from the sensor 11, and acquires the observation value.

Furthermore, the state recognition unit 31 recognizes the current state based on the observation value from the sensor 11, and supplies the result to the action selection unit 35, and the process advances from Step S45 to Step S46.

In Step S46, the action selection unit 35 determines whether or not the target state setting unit 34 sets a new action target state.

In Step S46, when it is determined that the target state setting unit 34 sets a new action target state, that is, when a user performs an operation so as, for example, to change the (action) target state, the target state setting unit 34 sets a new action target state based on the operation, and the result is supplied to the action selection unit 35, the process returns to Step S42, the action selection unit 35 calculates a state value V(S) having the new action target state set as a reference, and thereafter, the same process is repeated.

In addition, in Step S46, when it is determined that the target state setting unit 34 dos not set a new action target state, the process advances to Step S47, and the action selection unit 35 determines whether or not a condition of ending action control to end the action control process for autonomous actions is satisfied.

Herein, as the condition of ending the action control to end the action control process for autonomous actions, there is a command performed so that the action control process for autonomous actions ends by a user, coincidence of the current state with the action target state, or the like.

In Step S47, when it is determined that the condition of ending the action control is not satisfied, the process returns to Step S44, and thereafter, the same process is repeated.

In addition, in Step S47, when it is determined that the condition of ending the action control is satisfied, the action control unit 14 ends the action control process for autonomous actions.

Figure 16:
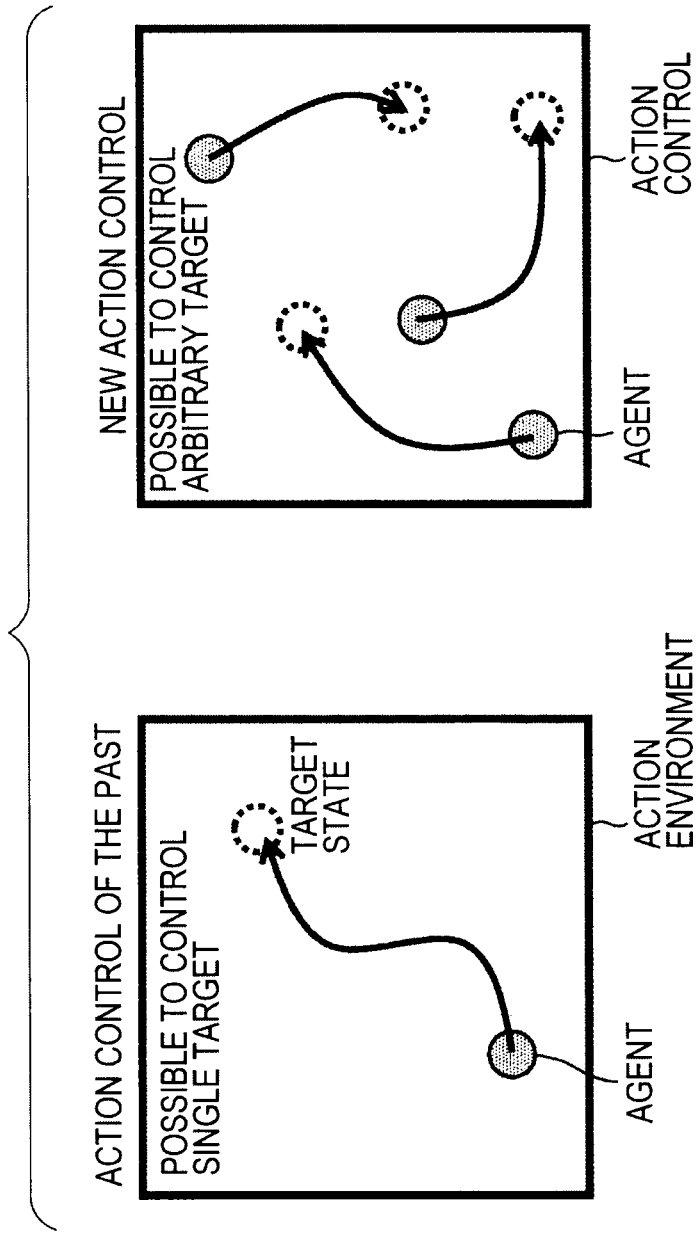
FIG. 16 is a diagram illustrating an action of the agent in the action environment.

FIG. 16 is a diagram illustrating an action in the action environment of the agent of FIG. 2 performed by the action control process for autonomous actions of FIG. 15.

In the action control of the past, the time when the action control based on an action value is possible is after the agent reaches the target state, and an action value for reaching the target state is calculated with reinforcement learning, and thus, if the target state is changed, it is necessary for the agent to perform reinforcement learning again to calculate an action value for reaching a target state after the change.

On the other hand, in action control by the action control process for autonomous action (new action control), since a state value V(s) having the action target state set as a reference and further an action value Q(S,U) for reaching the action target state using the state transition model $P_{SS'}^{U}$ (with which learning is performed at all times), a state value V(S) having the new action target state set as a reference and further an action value Q(S,U) for reaching the new action target state are easily calculated even when the action target state is changed to the new action target state, and it is possible to cause the agent to perform actions toward the new action target state.

Furthermore, when there is a state that the agent has to avoid (hereinafter, referred to as an avoidance state) in the action environment, and the avoidance state is given to the agent, the action selection unit 35 can select an action to reach the action target state while avoiding the avoidance state in the action control process for autonomous actions.

Figure 17:
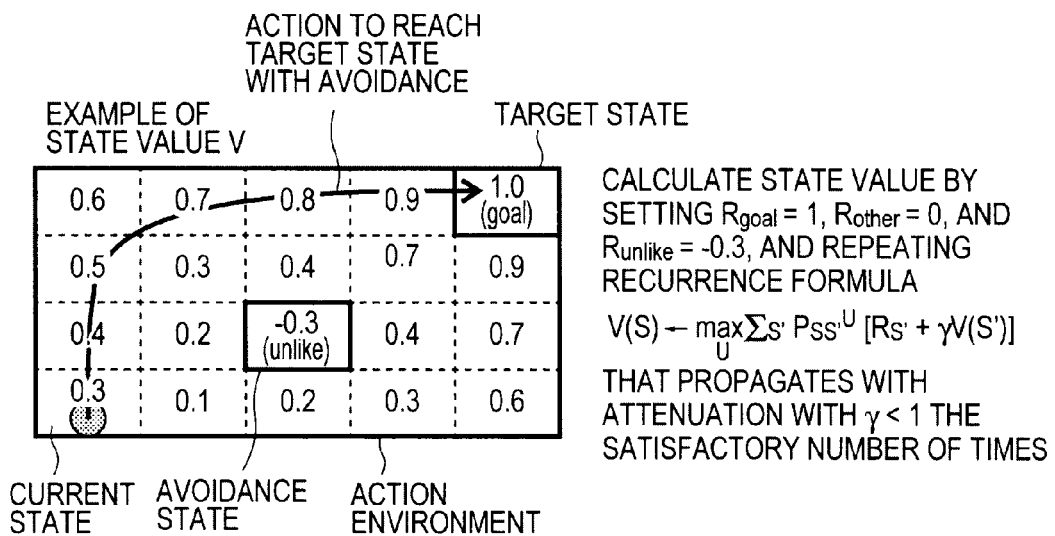
FIG. 17 is a diagram illustrating an action of the agent to reach an action target state while avoiding an avoidance state.

FIG. 17 is a diagram illustrating an action of the agent to reach the action target state while avoiding the avoidance state.

In order to avoid reaching the avoidance state, the action selection unit 35 uses 1 for the target state, a negative value, for example, −0.3 for the avoidance state, and 0 for a state other than the target state and the avoidance state as the constant $R_S'$ of Formula (2), in calculation of the state value V(S) having the action target state using the state transition model $P_{SS'}{}^{tU}$ according to the recurrence formula of Formula (2).

In other words, in Formula (2), if the constant $R_S'$ when the state S' is the target state is indicated by $R_{goal}$, the constant $R_S$ when the state S' is to be avoided is indicated by $R_{unlike}$, and the constant $R_S'$ when the state S' is a state other than the target state and the avoidance state is indicated by $R_{other}$, the constant $R_{goal}$ is 1, the constant $R_{unlike}$ is −0.3, and the constant $R_{other}$ is 0.

Herein, FIG. 17 shows an example of the state value V(S) having the target state s reference when the constant $R_{goal}$ is set to 1, the constant $R_{unlike}$ to −0.3, and the constant $R_{other}$ to 0, respectively.

With the setting above, the action selection unit 35 calculates the state value V(S) having the target state set as a reference, and then, calculates an action value Q(S,U) for each state S of the state transition models and each action U that the agent can perform using the state value V(S) according to Formula (3).

Then, the action selection unit 35 selects an action U that gives the maximum value in the action values Q(S,U) for the current state S among action values Q(S,U) for each state S and each action U as an action U performed in the current state S.

As described above, in Formula (2), by employing a negative value as the constant $R_{unlike}$ for an avoidance state, the state value V(S) having the target state set as a reference and further the action value Q(S,U) of an action toward the avoidance state, which is obtained using the state value V(S) for the avoidance state, become relatively small, and as a result, the agent performs actions so as to move toward the target state while avoiding the avoidance state, as shown by the arrow of FIG. 17.

[Application Example to Object Moving Task]

The learning process of the learning unit 12 and the action control process of the action control unit 14 can be applied to a task in which the agent simply moves in the action environment as described above (hereinafter, also referred to as a simple movement task), and also to a task in which the agent moves an object (hereinafter, also referred to as an object moving task), for example, in the action environment.

Figure 18:
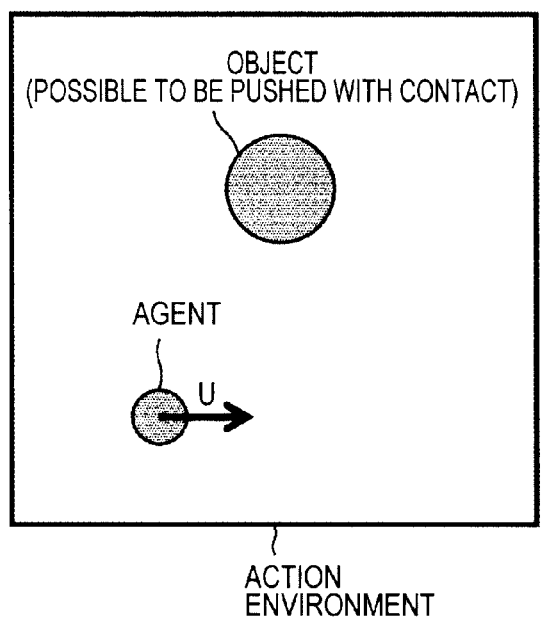
FIG. 18 is a diagram illustrating an object moving task.

FIG. 18 is a diagram illustrating the object moving task.

In the object moving task, an object that can be moved exists in addition to the agent in the action environment.

In FIG. 18, the action environment is an area (ground surface) on a two-dimensional plane, and the agent and the object move in the area.

Now, in FIG. 18, if the upper direction is assumed to the north, the agent can move to any direction of the east, the west, the south, the north, the northeast, the southeast, the southwest, and the northwest, by a predetermined distance with one action by, so to speak, its own efforts.

In addition, the agent can move (push) the object to a direction in which the agent moves when the agent contacts the objects.

The object is not able to move by itself, but moved only by pushing of the agent.

Figure 19:
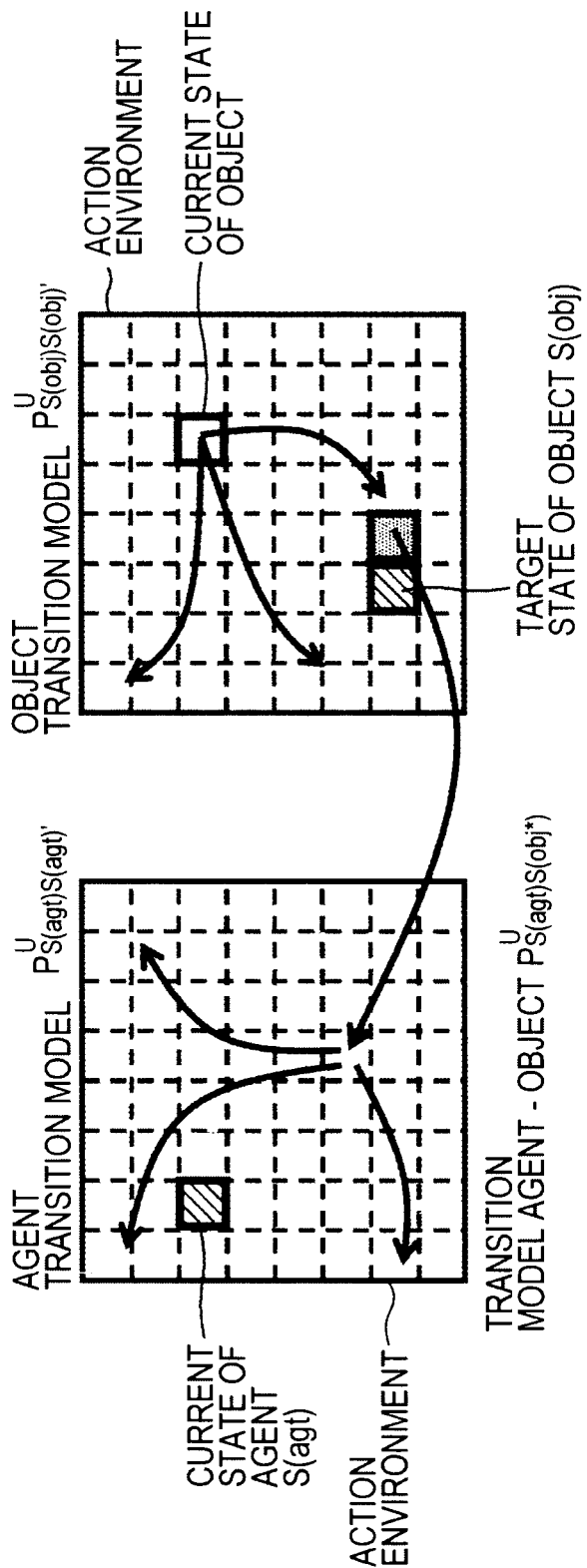
FIG. 19 is a diagram illustrating a state transition model when the object moving task is performed.

FIG. 19 is a diagram illustrating a state transition model when the object moving task is performed.

In FIG. 19, in regard to the object moving task, a small area obtained by dividing the action environment into small areas is employed as a state of a state transition move for each action in the same manner as in the simple movement task.

However, in regard to the object moving task, there are an agent state S(agt) and an object state S(obj) as a state of a state transition model for each action.

In addition, in the object moving task, the agent observes the current position thereof as an observation value, and can recognize the current state thereof based on the current position thereof, in the same manner as in the simple movement task.

Furthermore, in the object moving task, the agent observes the position of the object as an observation value, and can recognize the current state of the object based on the current position of the object.

In addition, in regard to the object moving task, as a state transition model $P_{SS'}{}^{tU}$ for each action, a state transition model (hereinafter, also referred to as an agent transition model) $P_{S(agt)S(agt)'}{}^{tU}$ indicating that the state of the agent is transited to the state S(agt)' by performing a predetermined action U in the state S(agt), an object transition model $P_{S(obj)S(obj)'}{}^{tU}$, and an agent-object transition model $P_{S(agt)S(obj*)}{}^{tU}$ are stored in the model storage unit 13.

Herein, the object transition model $P_{S(obj)S(obj)'}{}^{tU}$ indicates that the state of the object is transited from a state S(obj) to a state S(obj)' by the agent performing a predetermined action U.

In addition, the agent-object transition model $P_{S(agt)S(obj*)}{}^{tU}$ indicates that the state of the object is transited to the state S(obj*) by the agent performing a predetermined action U in the state S(agt).

As the object transition model $P_{S(obj)S(obj)'}{}^{tU}$, a frequency (or a transition probability) that the state of the object is transited to the state S(obj)' can be employed by the agent performing a predetermined action U when the state of the object is the state S(obj) in the same manner as in, for example, the agent transition model $P_{S(agt)S(agt)'}{}^{tU}$.

Further as the agent-object transition model $P_{S(agt)S(obj*)}{}^{tU}$, a frequency (or a transition probability) that the state of the object is transited to the state S(obj*)' can be employed by the agent performing a predetermined action U in the state S(agt) in the same manner as in, for example, the agent transition model $P_{S(agt)S(agt)'}{}^{tU}$.

In the object moving task, a target state is set for the object, and actions of the agent are controlled based on the agent transition model $P_{S(agt)S(obj)'}{}^{tU}$, the object transition model $P_{S(obj)S(obj)'}{}^{tU}$, and the agent-object transition model $P_{S(agt)S(obj*)}{}^{tU}$.

[Learning Process in Object Moving Task]

Figure 20:
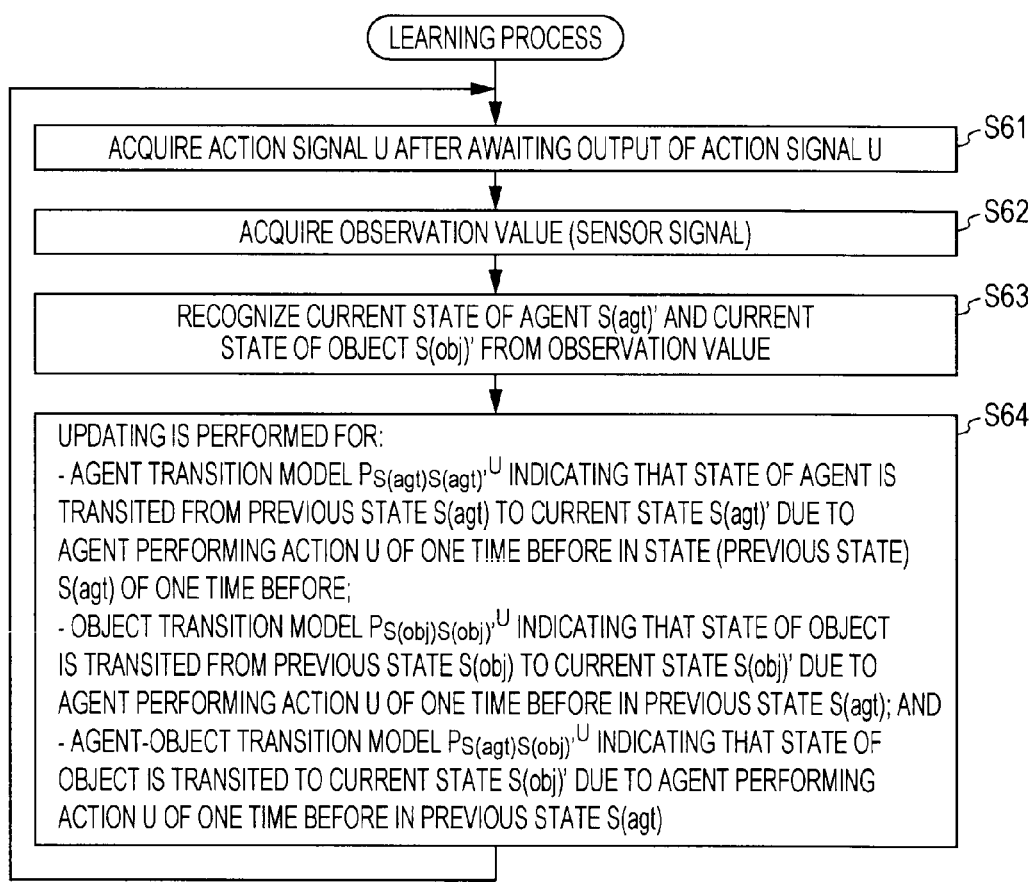
FIG. 20 is a flowchart explaining a learning process performed by the learning unit in the object moving task.

FIG. 20 is a flowchart explaining a learning process performed by the learning unit 12 in the object moving task.

Furthermore, the learning process of FIG. 20 is performed all the time while the agent performs actions, in the same manner as in, for example, the learning process of FIG. 6.

In Step S61, the learning unit 12 awaits the output of an action signal U from the action control unit 14, acquires (receives) the action signal U, and recognizes an action U of the agent performed based on the action signal U, and the process advances to Step S62.

In Step S62, the learning unit 12 acquires an observation value observed in the sensor 11 after the agent performed the action U corresponding to the action signal U previously output the action control unit 14, and the process advances to Step S63.

In Step S63, the learning unit 12 recognizes the current state of the agent S(agt)' and the current state of the object S(obj)' based on the observation value from the sensor 11, and the process advances to Step S64.

In Step S64, the learning unit 12 updates the agent transition model $P_{S(agt)S(agt)'}^{U}$, the object transition model $P_{S(obj)S(obj)'}^{U}$, and the agent-object transition model $P_{S(agt)S(obj)'}^{U}$ stored in the model storage unit 13 based on the current state of the agent S(agt)', the previous state S(agt) that is the current state one time before, the current state of the object S(obj)', and the previous state S(obj) that is the current state one time before.

In other words, the learning unit 12 updates the agent transition model $P_{S(agt)S(agt)'}^{U}$ by increasing the frequency as the agent transition model $P_{S(agt)S(agt)'}^{U}$ which indicates that the state of the agent is transited to the current state S(agt)' by performing the action U of one time before in the previous state S(agt), by 1.

Furthermore, the learning unit 12 updates the object transition model $P_{S(obj)S(obj)'}^{U}$ by increasing the frequency as the object transition model $P_{S(obj)S(obj)'}^{U}$, which indicates that the state of the object is transited from the previous state S(obj) to the current state S(obj)' by the agent performing the action U of one time before, by 1.

In addition, the learning unit 12 updates the agent-object transition model $P_{S(agt)S(obj)'}^{U}$ by increasing the frequency as the agent-object transition model $P_{S(agt)S(obj)'}^{U}$, which indicates that the state of the object is transited to the current state S(obj)' by the agent performing the action U of the one time before in the previous state S(agt) that is the current state one time before, by 1.

After the updating of the agent transition model $P_{S(agt)S(agt)'}^{U}$, the object transition model $P_{S(obj)S(obj)'}^{U}$, and the agent-object transition model $P_{S(agt)S(obj)'}^{U}$, the process returns from Step S64 to Step S61, and thereafter, the same process is repeated after waiting for the output of the action signal from the action control unit 14.

[Action Control Process in Object Moving Task]

Figure 21:
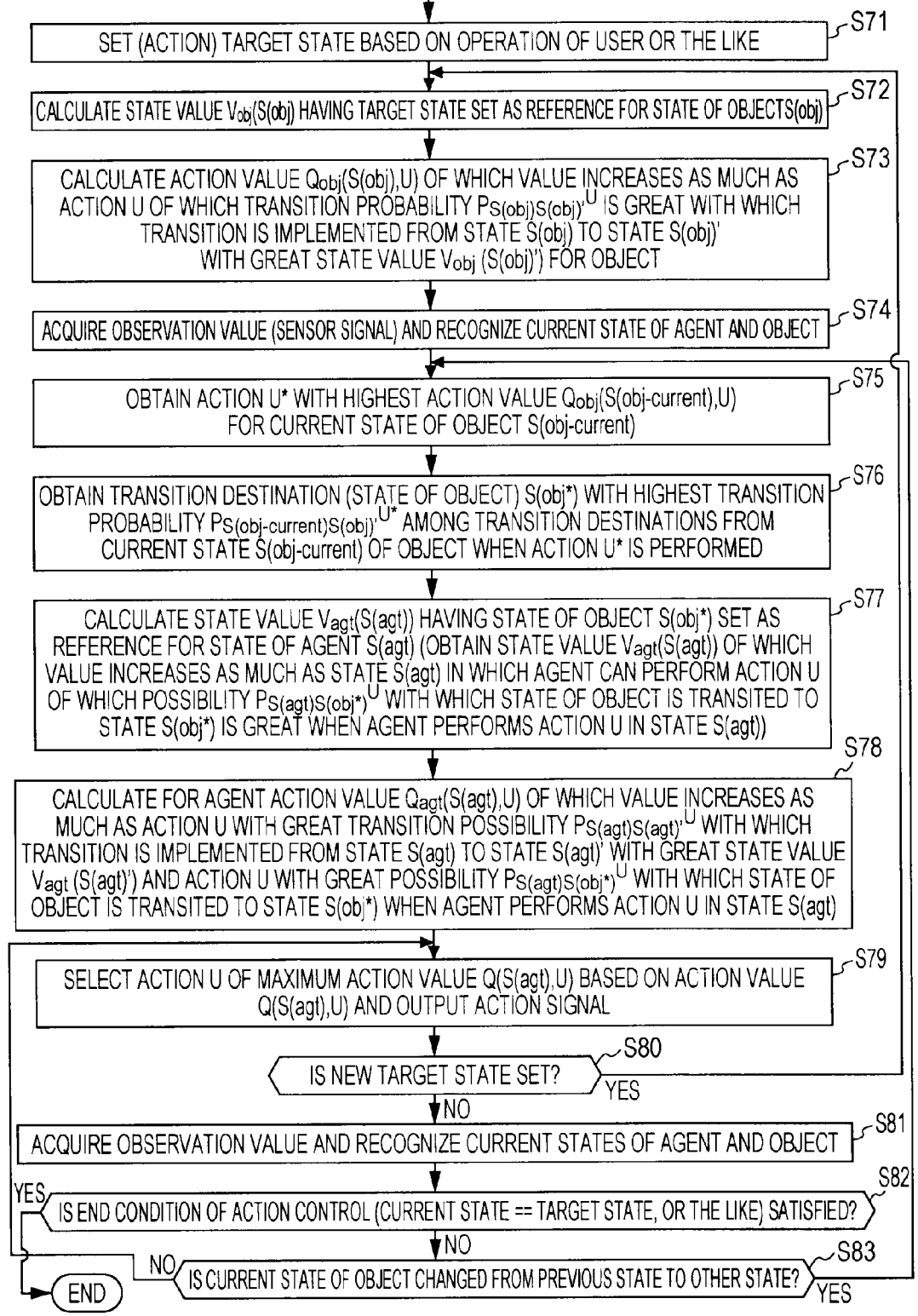
FIG. 21 is a flowchart explaining an action control process for an autonomous action performed by an action control unit in the object moving task.

FIG. 21 is a flowchart explaining an action control process for autonomous actions performed by the action control unit 14 (of FIG. 2) in the object moving task.

In the object moving task, a state given from the outside based on, for example, an operation of a user, or the like, is set to an action target state and actions of the agent are controlled so as to be toward the action target state in the action control process for autonomous actions, in the same manner as in the case of FIG. 15.

However, a state of the object is set in the action target state.

In Step S71, the action control unit 14 sets the state of the object given from the outside based on, for example, an operation of a user, or the like, to the action target state, and the process advances to Step S72.

For example, if the user performs an operation so that the state corresponding to the position where the object is to be moved is set to the target state, the action control unit 14 sets the state of the object according to the operation of the user to the action target state.

In Step S72, the action control unit 14 calculates a state value $V_{obj}(S(obj))$ having the action target state set as a reference for each state S(obj) of the object transition models using the object transition model $P_{S(obj)S(obj)'}^{U}$ according to Formula (9) the same as the recurrence formula of the above-described Formula (2), and the process advances to Step S73.

$$V_{obj}(S(obj)) \leftarrow \max_{U} \sum_{S(obj)'} P_{S(obj)S(obj)'}^{U} [R_{S(obj)'} + \gamma V_{obj}(S(obj)')] \quad \text{[Expression 9]}$$

Herein, in Formula (9), $\Sigma_{S(obj)'}$ indicates summation for all states s(obj)' of the object is performed, and max indicates the maximum value among values before max obtained for each action U.

Furthermore, in Formula (9), γ is the same attenuation constant as in the case of Formula (2).

In addition, in Formula (9), $R_{S(obj)'}$ indicates a constant set for the state of the object S(obj)' (of the transition destination of state transition). If a constant $R_S(obj)'$ when the state S(obj)' is the action target state is indicated by $R_{goal}$, and a constant $R_{S(obj)'}$ when the state s(obj)' is a state other than the action target state is indicated by $R_{other}$, the constant $R_{goal}$ is 1 and the constant $R_{other}$ is 0.

In Step S73, the action control unit 14 uses the object transition model $P_{S(obj)S(obj)'}^{U}$ and the state value $V_{obj}(S(obj))$ having the action target state set as a reference to calculate an action value $Q_{obj}(S(obj),U)$ for each state S(obj) of the object transition model and each action U that the agent can perform according to Formula (10) the same as Formula (3) described above, and the process advances to Step S74.

$$Q_{obj}(S(obj),U)=\Sigma_{S(obj)'} P_{S(obj)S(obj)'}^{U} V_{obj}(S(obj)') \quad \text{[Expression 10]}$$

In Step S74, the action control unit 14 awaits the output of the observation value observed after the action U of the agent from the sensor 11 to acquire the observation value, and recognizes the current states of the agent and the object based on the observation value, and the process advances to Step S75.

In Step S75, the action control unit 14 obtains an action U* that gives the maximum value in an action value $Q_{obj}$(S(obj–current),U) for the current state S(obj–current) based on the action value $Q_{obj}$(S(obj–current),U) for the current state of the object S(obj–current) among action values $Q_{obj}$(S(obj),U) for each state S(obj) of the object transition models and each action U that the agent can perform, and the process advances to Step S76.

In other words, in Step S75, the action U* is obtained according to Formula (11).

$$U* = \underset{U}{\mathrm{argmax}} Q_{obj}(S(obj-\text{current}), U) \quad \text{[Expression 11]}$$

Herein, in Formula (11), argmax indicates an action U that gives the maximum value in the action value $Q_{obj}$(S(obj),U) for the current state of the object S(obj–current).

In Step S76, the action control unit 14 obtains a state of the object S(obj*) of which a transition probability (frequency) $P_{S(obj-current)S(obj)'}^{U*}$ indicated by an object transition model is at the maximum among states of the object, which is the transition destination from the current state of the object S(obj–current) when the agent performs the action U*, and the process advances to Step S77.

In other words, in Step S76, the state of the object S(obj*) is obtained according to Formula (12).

$$S(obj*) = \underset{S(obj)'}{\operatorname{argmax}} P_{S(obj-current)S(obj)'}^{U*} \quad \text{[Expression 12]}$$

Herein, in Formula (12), argmax indicates the state of the object S(obj)', which is the transition destination, with the maximum transition probability $P_{S(obj-current)S(obj)'}^{U*}$ of the state transition from the current state of the object S(obj-current).

The state S(obj*) that is the state of the object S(obj)' as the transition destination obtained based on Formula (12) is a state with the highest probability $P_{S(obj-current)S(obj)'}^{U*}$ in the state of the object S(obj)' as the transition destination in state transition from the current state of the object S(obj-current) occurring by performance of the action U* with the highest action value $Q_{obj}(S(obj-current),U)$, that is, a state with the highest possibility as the transition destination in state transition of the object occurring by the agent performing the action U*.

In Step S77, the action control unit 14 calculates a state value $V_{agt}(S(agt))$ having the state of the object S(obj*) set as a reference for each state S(agt) of the agent by repeatedly calculating the recurrence formula of Formula (13) by the predetermined (satisfactory) number of times using the agent-object transition model $P_{S(agt)S(obj*)}^{U}$ of which the transition destination is the state of the object S(obj*) among agent-object transition models $P_{S(agt)S(obj)'}^{U}$ and the agent transition model $P_{S(agt)S(agt)'}^{U}$, and the process advances to Step S78.

$$V_{agt}(S(agt)) \leftarrow \quad \text{[Expression 13]}$$
$$\max_{U} \left\{ P_{S(agt)S(obj*)}^{U} + \sum_{S(agt)'} \gamma P_{S(agt)S(agt)'}^{U} V_{agt}(S(agt)') \right\}$$

Herein, in Formula (13), $\Sigma_{S(agt)'}$ indicates that summation for all states S(agt)' of the agent is performed, and γ is the same attenuation constant as in the case of Formula (2).

The value of the state value $V_{agt}(S(agt))$ having the state of the object S(obj*) set as a reference obtained by Formula (13) increases as much as the state S(agt) that the agent can perform an action U of which the transition probability (transition probability indicated by the agent-object transition model) $P_{S(agt)S(obj*)}^{U}$ is high, with which the state of the object is transited to the state S(obj*) when the agent performs the action U in the state of the agent S(agt).

In the state value $V_{agt}(S(agt))$ having the state of the object S(obj*) set as a reference, it can be said that the state value $V_{obj}(S(obj))$ having the action target state set as a reference obtained according to Formula (9), so to speak, propagates through the transition probability $P_{S(agt)S(obj*)}^{U}$ of the state transition to the state of the object S(obj*) close to the action target state.

In Step S78, the action control unit 14 calculates an action value $Q_{agt}(S(agt),U)$ for each state S(agt) of the agent transition models and each action U that the agent can perform using the agent-object transition model $P_{S(agt)S(obj*)}^{U}$ of which the transition destination is the state of the object S(obj*) among agent-object transition models $P_{S(agt)S(obj)'}^{U}$, the agent transition model $P_{S(agt)S(agt)'}^{U}$ and the state value $V_{agt}(S(agt))$ having the state of the object S(obj*) set as a reference according to Formula (14), and the process advances to Step S79.

$$Q_{agt}(S(agt),U) = P_{S(agt)S(obj*)}^{U} + \Sigma_{S(agt)'} P_{S(agt)S(agt)'}^{U} V_{agt}(S(agt)') \quad \text{[Expression 14]}$$

In Step S79, the action control unit 14 selects an action U that gives the maximum value in an action value $Q_{agt}(S(agt),U)$ for the current state S(agt) as the action U performed by the agent in the current state S(agt) based on the action value $Q_{agt}(S(agt),U)$ of the agent in the current state S(agt) among action values $Q_{agt}(S(agt),U)$ for each state S(agt) of the agent transition models and each action U that the agent can perform, and outputs an action signal U corresponding thereto, and the process advances to Step S80.

Herein, the action signal U output by the action control unit 14 is supplied to the learning unit 12 and the actuator 15.

The actuator 15 is driven according to the action signal U from the action control unit 14, and accordingly, the agent performs the action U according to the action signal U.

Furthermore, the learning unit 12 can perform the above-described learning process (of FIG. 20) using the action signal U from the action control unit 14 while the action control process for autonomous actions is performed.

In Step S80, the action control unit 14 determines whether or not a new action target state (the state of the object S(obj)) is set.

In Step S80, when it is determined that the new action target state is set, that is, for example, when an operation is performed so that a user changes the action target state, and the action control unit 14 sets the new action target state based on the operation, the process returns to Step S72, and the action control unit 14 calculates the state value $V_{obj}(S(obj))$ having the new action target state set as a reference, and thereafter, the same process is repeated.

In addition, in Step S80, when it is determined that the new action target state is not set, the process advances to Step S81, and the action control unit 14 awaits the output of the observation value observed after the action U of the agent from the sensor 11 to acquire the observation value.

Furthermore, the action control unit 14 recognizes the current states of the agent and the object based on the observation value from the sensor 11, and the process advances to Step S81 to Step S82.

In Step S82, the action control unit 14 determines whether or not a condition of ending action control to end the action control process for autonomous actions is satisfied, in the same manner as in Step S47 of FIG. 15.

In Step S82, when it is determined that the condition of ending the action control is not satisfied, the process advances to Step S83, and the action control unit 14 determines whether or not the current state of the object is changed from the previous state of the object to other state (a state other than the previous state).

In Step S83, when it is determined that the current state of the object is changed from the previous state of the object to other state, that is, when the object is moved by the action of the agent, and as a result, the state of the object is changed before and after the action of the agent, the process returns to Step S75, and the action control unit 14 obtains an action U* that gives the maximum value in the action value $Q_{obj}(S(obj-current),U)$ for the current state of the object S(obj-current) after the change, and thereafter, the same process is repeated.

In addition, in Step S83, when it is determined that the current state of the object is not changed from the previous state of the object to other state, that is, when the agent acted but the object is not moved, or when the object is moved by the action of the agent but the state of the object is not changed before and after the movement, the process returns to Step S79, and thereafter, the same process is repeated.

On the other hand, in Step S82, when it is determined that the condition of ending the action control is satisfied, the action control unit 14 ends the action control process for autonomous actions.

Figure 22:
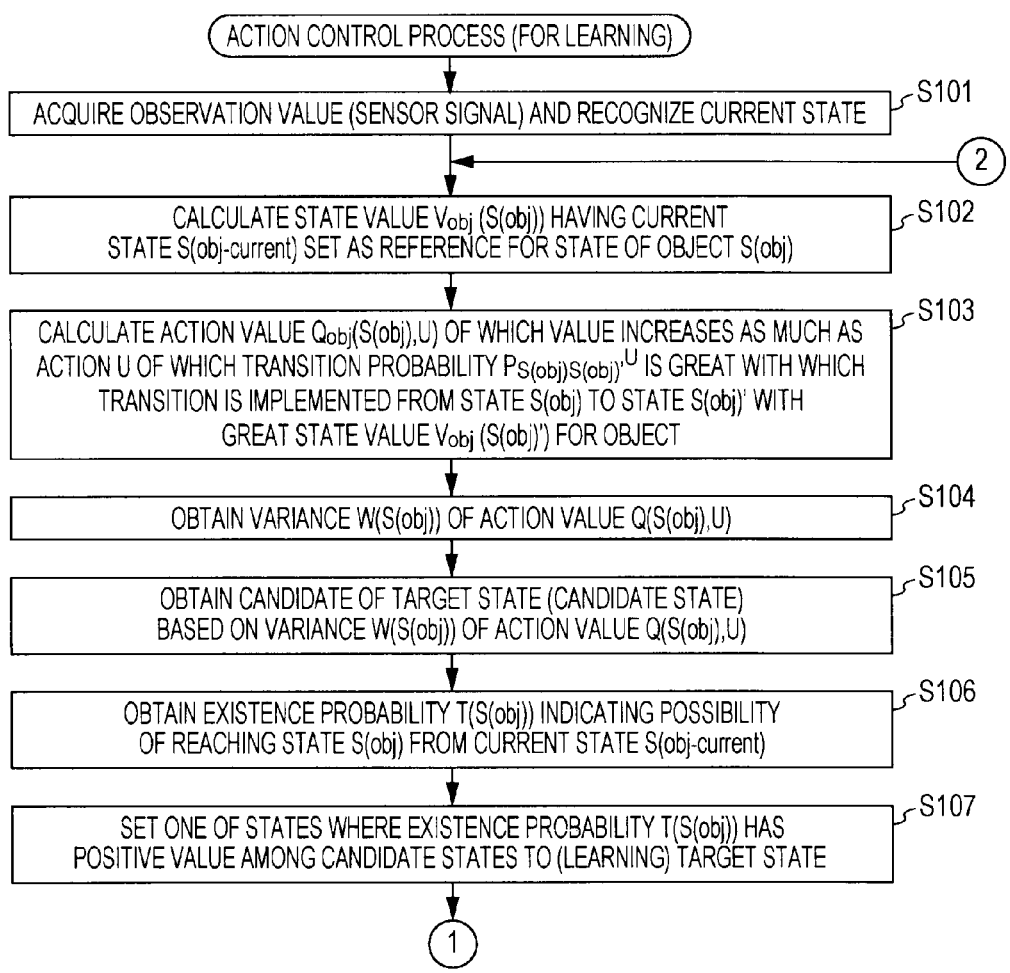
FIG. 22 is a flowchart explaining an action control process for learning performed by an action control unit in the object moving task.
Figure 23:
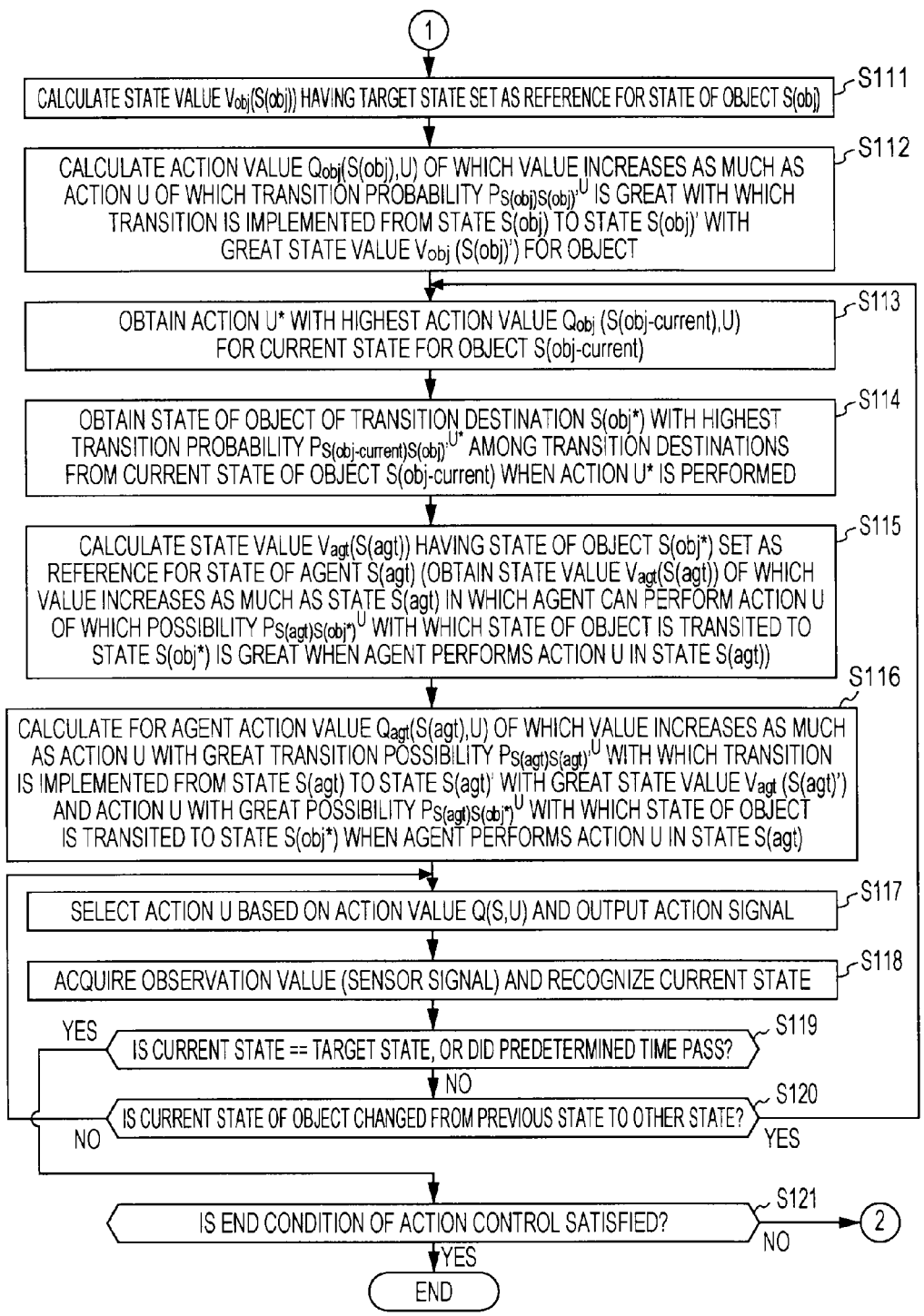
FIG. 23 is a flowchart explaining the action control process for learning performed by an action control unit in the object moving task.

FIGS. 22 and 23 are flowcharts explaining an action control process for learning performed by the action control unit 14 (of FIG. 2) in the object moving task.

In the action control process for learning of the object moving task, a learning target state is set so that the object easily reaches a state that the object has little experience of reaching or a state that the object has no experience of reaching, the action of the agent is controlled so that the state of the object moves toward the learning target state in the same manner as in the case of FIG. 13, and accordingly, learning of the agent transition model $P_{S(agt)S(agt)}{'}^U$, the object transition model $P_{S(obj)S(obj)}{'}^U$, and the agent-object transition model $P_{S(agt)S(obj)}{'}^U$ are efficiently performed in the learning process of FIG. 20.

Furthermore, the agent performs innate actions performed in compliance of rules determined, for example, at random or in advance before the agent performs the action control process for learning of FIGS. 22 and 23 for the first time, and performs a certain degree of learning for the action environment by the learning process (of FIG. 20) performed between the innate actions.

Thus, the agent gains the agent transition model $P_{S(agt)S(agt)}{'}^U$, the object transition model $P_{S(obj)S(obj)}{'}^U$, and the agent-object transition model $P_{S(agt)S(obj)}{'}^U$, which indicate a frequency other than 0, within the range of states of the agent and the object that the agent has reached by the innate actions before performing the action control process for learning of FIGS. 22 and 23 for the first time.

In Step S101, the action control unit 14 awaits the output of the observation value observed after the agent performed the action corresponding to the action signal previously output, from the sensor 11 to acquire the observation value.

Furthermore, the action control unit 14 recognizes the current states of the agent and the object based on the observation value from the sensor 11, and the process advances from Step S101 to Step S102.

In Step S102, the action control unit 14 calculates a state value $V_{obj}(S(obj))$ having the current state of the object S(obj−current) set as a reference for each state s(obj) of the object transition models using the object transition model $P_{S(obj)S(obj)}{'}^U$, according to the recurrent formula of Formula (9) described above, and the process advances to Step S103.

Herein, in calculation of the state value $V_{obj}(S(obj))$ having the current state of the object S(obj−current) set as a reference according to the recurrent formula of Formula (9), if a constant $R_{S(obj)}{'}$ when the state S(obj)' is the current state S(obj−current) is indicated by $R_{current}$, and a constant $R_{S(obj)}{'}$ when the state S(obj)' is a state other than the current state S(obj−current) is indicated by $R_{other}$, the constant $R_{current}$ is 1 and the constant $R_{other}$ is 0.

In Step S103, the action control unit 14 calculates an action value $Q_{obj}(S(obj),U)$ for each state s(obj) of the object transition models and each action U that the agent can perform based on the state value $V_{obj}(S(Obj))$ having the current state of the object S(obj−current) set as a reference according to Formula (10) described above, and the process advances to Step S104.

In Step S104, the action control unit 14 obtains a variance W(S(obj)) of the action value $Q_{obj}(S(obj),U)$ for each state of the object S(obj) based on the action value $Q_{obj}(S(obj),U)$ as described in Formulas (4) and (5) above, and the process advances to Step S105.

In Step S105, the action control unit 14 obtains candidates of the learning target state, that is, selects states of the object of which the variance W(S(obj)) of the action value $Q_{obj}(S(obj),U)$ is equal to or higher than a predetermined threshold value as candidates of the learning target state based on the variance W(S(obj)) of the action value $Q_{obj}(S(obj),U)$, and the process advances to Step S106.

In Step S106, the action control unit 14 obtains an existence probability T(S) of being in the current state of the object S(obj−current) by state transitions within a predetermined number of times for each state of the object S(obj) based on the object transition model $P_{S(obj)S(obj)}{'}^U$ stored in the model storage unit 13 by repeatedly calculating the recurrence formula as described in Formula (6) above, and the process advances to Step S107.

In Step S107, the action control unit 14 selects one state of which the existence probability T(S) is greater than 0 (a positive value) (a reachable state) from the candidates of the learning target state, for example, at random, and sets the selection to the learning target state.

Then, the process advances from Step S107 to Step S111 of FIG. 23, and thereafter, the action of the agent is controlled so that the state of the object is toward the learning target state.

In other words, FIG. 23 is a flowchart continuing from FIG. 22.

In Step S111, the action control unit 14 calculates a state value $V_{obj}(S(obj))$ having the learning target state set as a reference for each state S(obj) of the object transition models using the object transition model $P_{S(obj)S(obj)}{'}^U$ according to Formula (9) described above, and the process advances to Step S112.

Herein, in calculating the state value $V_{obj}(S(obj))$ having the learning target state set as a reference according to Formula (9), if a constant $R_{S(obj)}{'}$ when the state S(obj)' is the learning target state is indicated by $R_{goal}$, and a constant $R_{S(obj)}{'}$ when the state S(obj)' is a state other than the learning target state is indicated by $R_{other}$, the constant $R_{goal}$ is 1 and the constant $R_{other}$ is 0.

In Step S112, the action control unit 14 calculates an action value $Q_{obj}(S(obj),U)$ for each state of the object transition models S(obj) and each action U that the agent can perform using the object transition model $P_{S(obj)S(obj)}{'}^U$ and the state value $V_{obj}(S(obj))$ having the learning target state set as a reference according to Formula (10) described above, and the process advances to Step S113.

In Step S113, the action control unit 14 obtains an action U* that gives the maximum value in an action value $Q_{obj}(S(obj−current),U)$ for the current state S(obj−current) based on the action value $Q_{obj}(S(obj−current),U)$ for the current state of the object S(obj−current) among action values $Q_{obj}(S(obj),U)$ for each state S(obj) of the object transition models and each action U that the agent can perform, and the process advances to Step S114.

In Step S114, the action control unit 14 obtains a state of the object S(obj*) of which the transition probability (frequency) $P_{S(obj−current)S(obj)}{'}^{U*}$ indicated by the object transition model among states of the object that is the transition destination from the current state of the object S(obj−current) when the agent performs the action U*, and the process advances to Step S115.

In Step S115, the action control unit 14 calculates a state value $V_{agt}(S(agt))$ having the state of the object S(obj*) set as a reference for each state S(agt) of the agent by repeatedly calculating the recurrence formula of Formula (13) by the predetermined (satisfactory) number of times using the agent-object transition model $P_{S(agt)S(obj*)}{}^U$ of which the transition destination is the state of the object S(obj*) among agent-object transition models $P_{S(agt)S(obj)}{}^U$ and the agent transition model $P_{S(agt)S(agt)}{}^U$, and the process advances to Step S116.

In Step S116, the action control unit 14 calculates an action value $Q_{agt}(S(agt),U)$ for each state S(agt) of the agent transition models and each action U that the agent can perform according to the above-described Formula (14) using the agent-object transition model $P_{S(agt)S(obj*)}{}^U$ of which the transition destination is the state of the object S(obj*) among agent-object transition models $P_{S(agt)S(obj)}{}^U$, the agent transition model $P_{S(agt)S(agt)}{}^U$, and the state value $V_{agt}(S(agt))$ having the state of the object S(obj*) set as a reference, and the process advances to Step S117.

In Step S117, the action control unit 14 selects an action U performed by the agent in the current state S(agt) based on the action value $Q_{agt}(S(agt),U)$ for the current state of the agent S(agt) among action values $Q_{agt}(S(agt),U)$ for each state S(agt) of the agent transition models and each action U that the agent can perform, with the ε-greedy method or the softmax method, for example, in the same manner as in Step S30 of FIG. 13, and outputs an action signal U corresponding thereto.

Herein, the action signal U output from the action control unit 14 is supplied to the learning unit 12 and the actuator 15.

The actuator 15 is driven according to the action signal U from the action control unit 14, and accordingly, the agent performs the action U according to the action signal U.

Furthermore, the learning unit 12 can perform the above-described learning process (of FIG. 20) using the action signal U from the action control unit 14 while the action control process for learning is performed.

When the agent performs the action U according to the action signal U, the process advances from Step S117 to Step S118, and the action control unit 14 awaits the output of the observation value observed after the action U of the agent from the sensor 11 to acquire the observation value.

Furthermore, the action control unit 14 recognizes the current states of the agent and the object based on the observation value from the sensor 11, and the process advances from Step S118 to Step S119.

In Step S119, the action control unit 14 determines whether or not the current state from the action control unit 14 coincides with the (latest) learning target state from the action control unit 14 and whether or not a predetermined time t1 passed after the (latest) learning target state is supplied from the action control unit 14.

In Step S119, when it is determined that the current state from the action control unit 14 does not coincide with the learning target state from the action control unit 14 and the predetermined time t1 did not pass after the learning target state is supplied from the action control unit 14, the process advances to Step S120, and the action control unit 14 determines whether or not the current state of the object is changed to other state (a state other than the previous state) from the previous state of the object.

In Step S120, when it is determined that the current state of the object is changed to other state from the previous state of the object, that is, when the object is moved by the action of the agent, and as a result, the state of the object is changed before and after the action of the agent, the process returns to Step S113, and the action control unit 14 obtains an action U* that gives the maximum value in the action value $Q_{obj}(S(obj-current),U)$ for the current state of the object S(obj-current) after the change, and thereafter, the same process is repeated.

In addition, in Step S120, when it is determined that the current state of the object is not changed from the previous state of the object to other state, that is, when the agent acted but the object is not moved, or when the object is moved by the action of the agent but the state of the object is not changed before and after the movement, the process returns to Step S117, and thereafter, the same process is repeated.

On the other hand, in Step S119, when it is determined that the current state from the action control unit 14 coincides with the learning target state from the action control unit 14, that is, when the agent reaches the learning target state, or when it is determined that the predetermined time t1 passed after the learning target state is supplied from the action control unit 14, that is, when the agent was not able to reach the learning target state for the predetermined time t1, the process advances to Step S121, and the action control unit 14 determines whether or not a condition of ending action control to end the action control process for learning is satisfied, in the same manner as in Step S33 of FIG. 13.

In Step S121, when it is determined that the condition of ending the action control is not satisfied, the process returns to Step S102 of FIG. 22, and thereafter, the same process is repeated.

In addition, in Step S121, when it is determined that the condition of ending the action control is satisfied, the action control unit 14 ends the action control process for learning.

[Other Example of State of State Transition Model]

In the above, a small area obtained by dividing an action environment into such small areas is employed as the state of state transition models (agent transition model, object transition model, and agent-object transition model) $P_{SS'}{}^U$, but the state of the state transition models can be realized using other model, for example, the latent variable model such as the GMM (Gaussian Mixture Model), the HMM (Hidden Markov Model), or the like.

In other words, as the state of the state transition model $P_{SS'}{}^U$, for example, the state of the GMM or the HMM can be employed.

When the state of the GMM or the HMM is employed as the state of the state transition model $P_{SS'}{}^U$, an action value used in selection an action can be obtained based on a posterior probability in the action control unit 14.

In other words, when a small area obtained by dividing the action environment is employed as the state of the state transition model $P_{SS'}{}^U$, an action value Q(S,U) for each state S of the state transition model is obtained as an action value used in selecting an action, but when the GMM or the HMM is employed as the state of the state transition model $P_{SS'}{}^U$, an action value Q(O,U) used for performing an action U can be obtained as an action value used in selecting an action when an observation value O is observed in the action control unit 14.

When the observation value O is observed, the action value Q(O,U) used for performing the action U can be obtained according to, for example, Formula (15).

$$Q(O, U) = \sum_S P(U \mid S) P(S \mid O) \qquad \text{[Expression 15]}$$
$$= \sum_S \left( \sum_{S'} P_{SS'}^U V(S') \right) P(S \mid O)$$

Herein, in Formula (15), P(S|O) indicates a probability (posterior probability) of being in the state S when the observation value O is observed. When the state of the HMM is employed as the state of the state transition model $P_{SS'}^{\prime U}$, the probability P(S|O) can be obtained using time series data of the observation value, that is, time series data O of the observation value observed from the time backdated from the latest observation value was observed by a predetermined time to the latest time.

In addition, in Formula (15), P(U|S) is a probability with which the action U is performed in the state S. Furthermore, Σ indicates the summation for the state S', and thus, the probability P(U|S) is obtained by taking the sum of the product $P_{SS'}^{\prime U} V(S')$ of the transition probability (transition probability indicated by a state transition model) $P_{SS'}^{\prime U}$ and a state value V(S') of the state S' of the transition destination for all states S' of the transition destination.

Furthermore, when the state of the HMM is employed as the state of the state transition model $P_{SS'}^{\prime U}$, a transition probability of the HMM $a_{ij}$ is extended to a transition probability $a_{ij}(U)$ for each action U performed by the agent, and the transition probability $a_{ij}(U)$ for each action U can be used as the transition probability $P_{SS'}^{\prime U}$ of Formula (15).

Herein, the HMM in which the transition probability $a_{ij}$ is extended to the transition probability $a_{ij}(U)$ for each action U is referred to as an extended HMM. The extended HMM will be described later.

Figure 24:
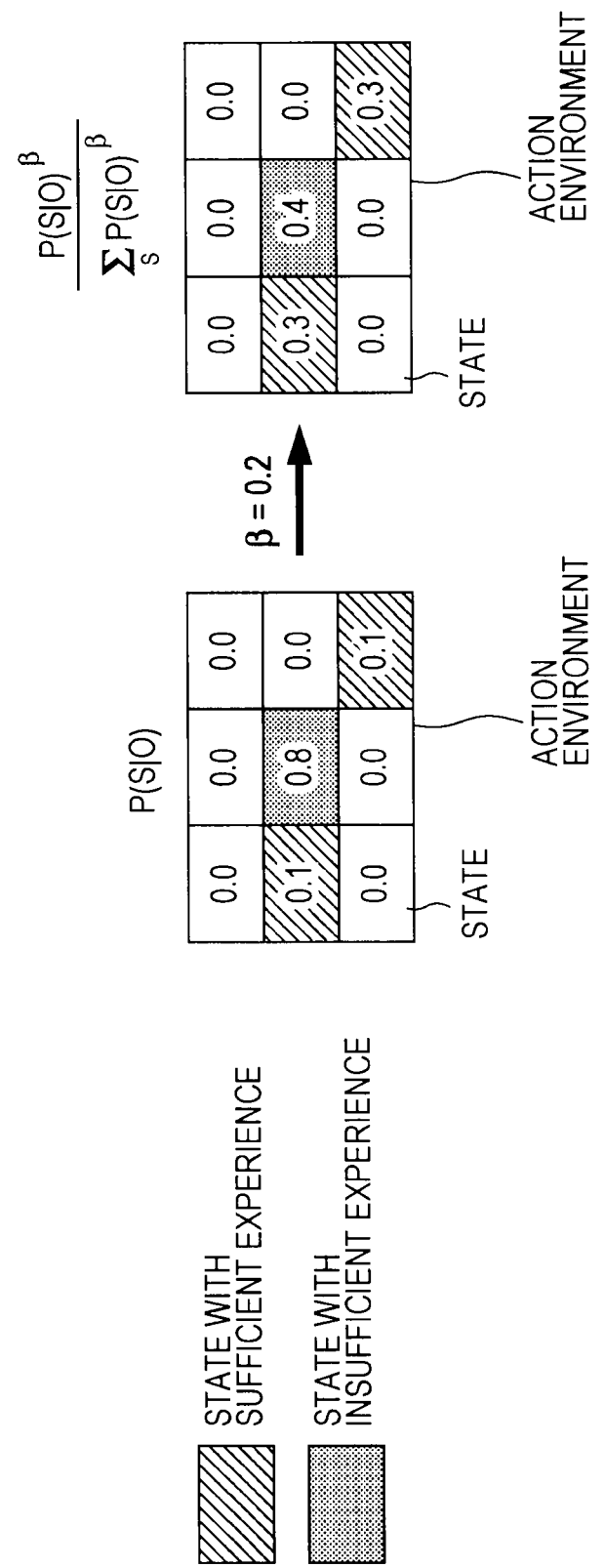
FIG. 24 is a diagram illustrating control of a posterior probability used in obtaining an action value, using a temperature parameter.

FIG. 24 is a diagram illustrating a posterior probability used in obtaining an action value Q(O|U) is controlled using a so-called temperature parameter β when the state of the state transition model $P_{SS'}^{\prime U}$ is expressed using the latent variable model.

When the observation value O is observed, the action value Q(O|U) used for performing the action U can be obtained according to Formula (16), instead of Formula (15).

$$Q(O, U) = \sum_S P(U|S) \frac{P(S|O)^\beta}{\sum_S P(S|O)^\beta} \quad \text{[Expression 16]}$$

Herein, in Formula (16), the temperature parameter β is a value in the range of 0<β≤1.

According to Formula (16), an action value Q(O|U) is obtained using a value $P(S|O)^\beta / \Sigma P(S|O)^\beta$ obtained by normalizing a value obtained by raising the posterior probability P(S|O) of Formula (15) as a posterior probability, to the power of β.

$P(S|O)^\beta / \Sigma P(S|O)^\beta$ as a posterior probability can be controlled by the temperature parameter β, and thus, according to the temperature parameter β, it is possible to control ambiguity of being in the state S or not when the observation value O is observed.

Furthermore, when the temperature parameter β is set to 1, $P(S|O)^\beta / \Sigma P(S|O)^\beta$ as a posterior probability is equal to the posterior probability P(S|O) of Formula (15).

When the temperature parameter β is set to a value less than 1, for example, 0.2 or the like, and when the current state is a state that the agent has little experience, that is, the agent is in a state where the agent has little experience of taking various actions, it is possible that appropriate actions will be performed.

In other words, in a state corresponding to a circumstance where the agent contacts the wall in an action environment, for example, if the agent has a great deal of experience of bumping into the wall, but little experience of taking other actions, in the action value Q(O|U) of Formula (15), the agent is highly possible to continue to bump into the wall.

On the other hand, according to the action value Q(O|U) of Formula (16) where the temperature parameter β is set to a value less than 1, for example, 0.2 or the like, it is easy for the agent to perform an action that the agent has experienced in a state other than the state corresponding to the circumstance where the agent contacts the wall in the action environment, for example, in a state where the agent has a great deal of experience of taking various actions, and further, it is easy for the agent to perform actions (proper actions) other than the action of bumping into the wall.

FIG. 24 shows a posterior probability P(S|O) and a posterior probability $P(S|O)^\beta / \Sigma P(S|O)^\beta$ when the temperature parameter β is set to 0.2.

In FIG. 24, in regard to a posterior probability P(S|O), a posterior probability P(S|O) in a state with insufficient experience is set to 0.8, and a posterior probability P(S|O) in a state with sufficient experience is set to 0.1, but the difference between the posterior probability P(S|O) in a state with insufficient experience and the posterior probability P(S|O) in a state with sufficient experience is very large.

The action value Q(O|U) obtained using such a posterior probability P(S|O) is strongly affected by a posterior probability P(S|O) with a high value, that is, the posterior probability P(S|O) in a state with insufficient experience.

On the other hand, in regard to a posterior probability $P(S|O)^\beta / \Sigma P(S|O)^\beta$, a posterior probability $P(S|O) / \Sigma P(S|O)^\beta$ in a state with insufficient experience is set to 0.4, and a posterior probability $P(S|O)^\beta / \Sigma P(S|O)^\beta$ in a state with sufficient experience is set to 0.3, and the difference between the a posterior probability $P(S|O)^\beta / \Sigma P(S|O)^\beta$ in a state with insufficient experience and the posterior probability $P(S|O)^\beta / \Sigma P(S|O)^\beta$ in a state with sufficient experience is not that great (ambiguity of being in each state is great).

The action value Q(O|U) obtained using such a posterior probability $P(S|O)^\beta / \Sigma P(S|O)^\beta$ is affected by the posterior probabilities $P(S|O)^\beta / \Sigma P(S|O)^\beta$ in a state with insufficient experience and in a state with sufficient experience to the same degree.

Furthermore, the agent obtains an action value Q(O|U) using a posterior probability P(S|O) as default, and can obtain an action value Q(O|U) using posterior probabilities $jP(S|O)^\beta / \Sigma P(S|O)^\beta$ only for the time when the agent is in the state with insufficient experience (with a high possibility).

For example, a user can teach the agent that the agent is in the state with insufficient experience.

In addition, when the agent remains in the same state for a certain time period or longer, it is highly possible that the agent has insufficient experience of performing an action for transiting the state to other state, and thus, the agent determines whether or not the agent remains the same state for a certain time period or longer, and the agent can determined that the agent is in a state with insufficient experience for the time when the agent remains in the same state for a certain time period or longer.

Figure 25:
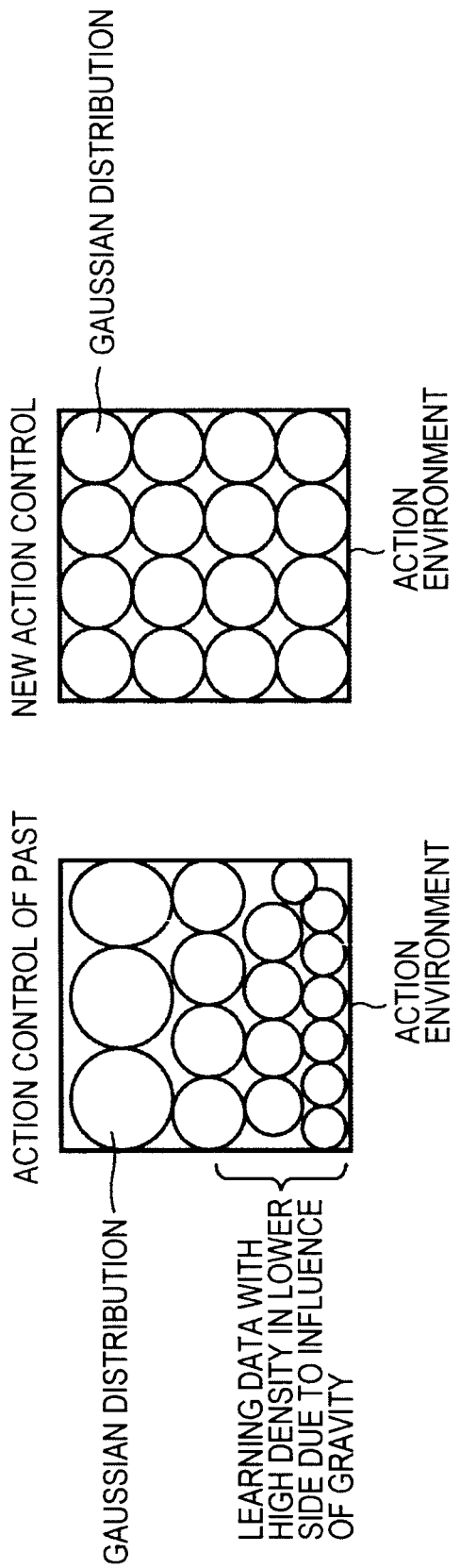
FIG. 25 is a diagram illustrating learning of GMM performed when the GMM is adopted as a state of a state transition model.

FIG. 25 is a diagram illustrating learning of the GMM performed when the GMM is employed as the state of the state transition model $P_{SS'}^{\prime U}$.

When the GMM is employed as the state of the state transition model $P_{SS'}^{\prime U}$, learning of the GMM as a state, that is, learning of Gaussian distribution as probability distribution in which the observation value O is observed in the GMM, using the observation value O that is a continuous value observed in the agent.

Learning data that is the observation value O used in learning of the GMM is acquired (observed) in the movement destination for the agent that moves (acts) in the action environment.

Therefore, if gravity is set in an action environment in which the agent performs random actions can move to, for example, the upper and lower side, there are a lot of opportunities to move to the lower side in the action environment, and few opportunities to move in the upper side, and thus, a great deal of learning data is acquired for the lower side of the action environment, but only a little learning data can be acquired for the upper side of the action environment. As a result, bias occurs in the density of learning data acquired from the action environment (density of positions where the observation value O that is the learning data is observed).

In other words, learning data is acquired at close positions in the lower side of the action environment, but learning data is acquired at scattered positions in the upper side of the action environment.

As described above, when there is bias in the density of learning data acquired from the action environment, bias occurs also in a state as the GMM obtained by learning using such learning data (also in a configuration of a model including a plurality of GMMs indicating the agent acting in the action environment).

In other words, for the agent performing random actions by the past action control, dispersion of Gaussian distribution indicating distribution of the observation value O observed in the state as the GMM obtained by learning becomes small in the state corresponding to the lower side of the action environment, and becomes great in the state corresponding to the upper side of the action environment as shown in FIG. 25, according to the bias in density of learning data acquired from the action environment.

On the other hand, according to action control by the action control process for learning (new action control), since the agent performs actions of movement thoroughly in the action environment as described in FIG. 13, (the observation value O that will serve as) learning data is acquired thoroughly from the action environment.

As a result, dispersion of Gaussian distribution indicating distribution of the observation value O observed in the state as the GMM obtained by learning is uniform in the entire action environment with little bias (if any), as shown in FIG. 25.

[Extended HMM]

Next, the extended HMM mentioned above will be described.

Figure 26:
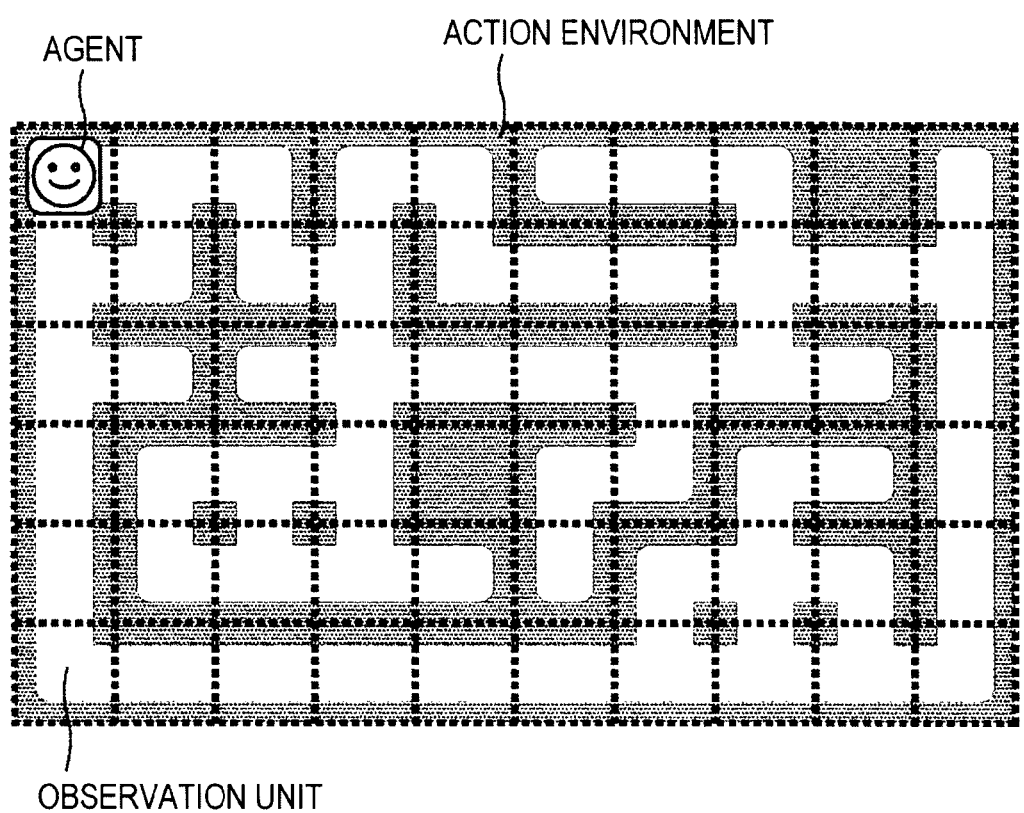
FIG. 26 is a diagram showing an example of an action environment where an agent applied with the extended HMM performs actions.

FIG. 26 is a diagram showing an example of an action environment where the agent of FIG. 2 to which the extended HMM is applied performs actions.

In FIG. 26, the action environment is a maze in a two-dimensional plane, and the agent can move along the white portion in the drawing as a passage.

Figure 27A:
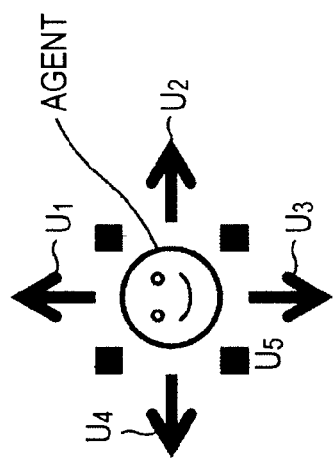
FIGS. 27A and 27B are diagrams showing examples of actions performed by the agent and observation values obtained by observation by the agent in an action environment.
Figure 27B:
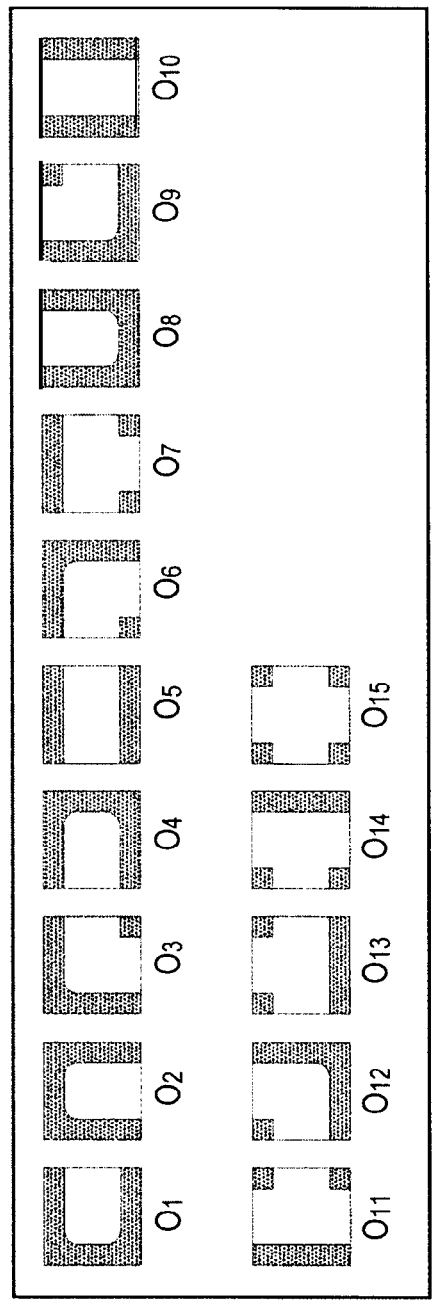

FIGS. 27A and 27B show examples of actions performed by the agent and observation values observed by the agent in the action environment.

The agent assumes areas in the drawing divided into square shapes in dotted lines in the action environment shown in FIG. 26 as units of observing observation values (observation unit), and performs actions of moving the observation units.

FIG. 27A shows types of actions performed by the agent.

In FIG. 27A, the agent can perform five actions $U_1$ to $U_5$ in total including an action $U_1$ to move in the upper (north) direction by observation units, an action $U_2$ to move to the right (east) direction by observation units, an action $U_3$ to move to the lower (south) direction by observation units, an action $U_4$ to move to the left (west) direction by observation units, and an action $U_5$ of no movement (doing nothing).

FIG. 27B schematically shows types of observation values observed by the agent with observation units.

In the present embodiment, the agent observes any one of 15 types of observation values (symbols) $O_1$ to $O_{15}$ in the observation units.

An observation value $O_1$ is observed as an observation unit with walls in the upper, lower, and left sides and a passage in the right side, and an observation value $O_2$ is observed as an observation unit with walls in the upper, left, and right sides and a passage in the lower side.

An observation value $O_3$ is observed as an observation unit with walls in the upper and left sides and a passage in the lower and right side, and an observation value $O_4$ is observed as an observation unit with walls in the upper, lower, and right sides, and a passage in the left side.

An observation value $O_5$ is observed as an observation unit with walls in the upper, and lower sides and a passage in the left and right sides, and an observation value $O_6$ is observed as an observation unit with walls in the upper and right sides and a passage in the lower and left sides.

An observation value $O_7$ is observed as an observation unit with walls in the upper side and a passage in the lower, left, and right sides, and an observation value $O_8$ is observed as an observation unit with walls in the lower, left, and right sides and a passage in the upper side.

An observation value $O_9$ is observed as an observation unit with walls in the lower and left sides and a passage in the upper and right sides, and an observation value $O_{10}$ is observed as an observation unit with walls in the left and right sides and a passage in the lower and upper sides.

An observation value $O_{11}$ is observed as an observation unit with walls in the left side and a passage in the upper, lower, and right sides, and an observation value $O_{12}$ is observed as an observation unit with walls in the lower and right sides and a passage in the upper and left sides.

An observation value $O_{13}$ is observed as an observation unit with walls in the lower side and a passage in the upper, left, and right sides, and an observation value $O_{14}$ is observed as an observation unit with walls in the right side and a passage in the upper, lower, and left sides.

An observation value $O_{15}$ is observed as an observation unit with a passage of all upper, lower, left, and right sides.

Furthermore, herein, both action $U_m$ (m=1, 2, ..., M (M is the total number of (types of) actions) and observation value $O_k$ (k=1, 2, ..., K (K is the total number of observation values)) are discrete values.

Figure 28:
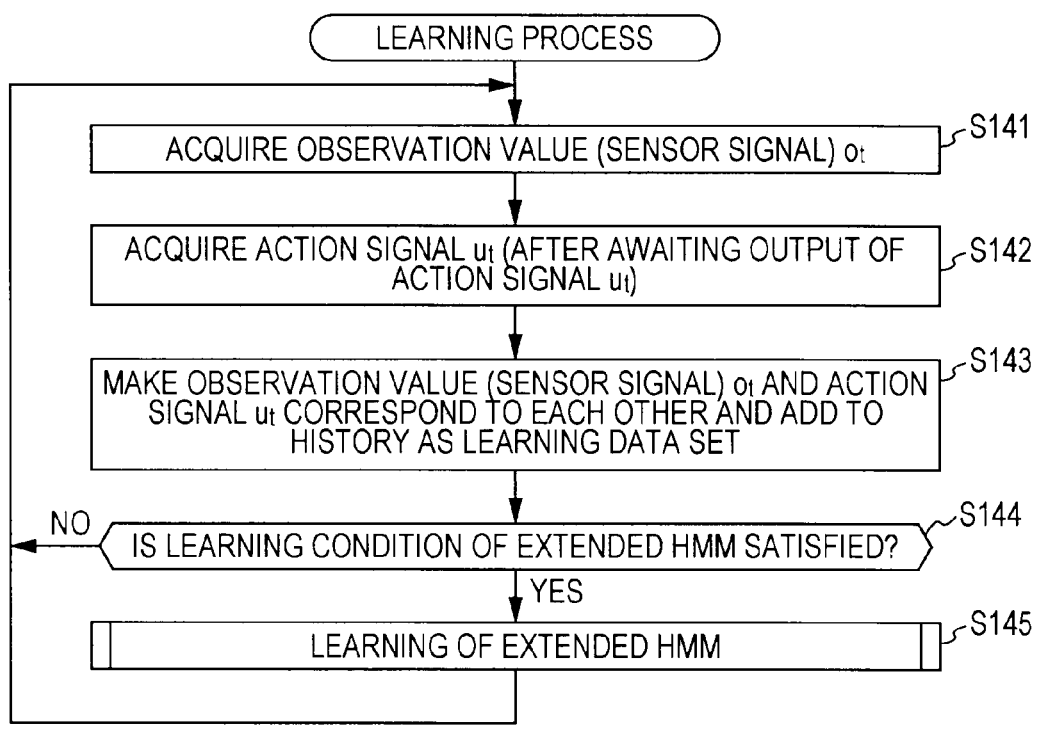
FIG. 28 is a flowchart explaining a learning process of the learning unit in the agent applied with the extended HMM.

FIG. 28 is a flowchart explaining a learning process performed by the learning unit 12 in the agent of FIG. 2 to which the extended HMM is applied.

In Step S141, the learning unit 12 awaits the output of the current observation value (observation value of the current time t) $o_t$ by the sensor 11, which is observed from the action environment, to acquire the observation value $o_t$, and the process advances to Step S142.

Herein, the observation value $o_t$ of the (current) time t is any one of 15 observation values $O_1$ to $O_{15}$ shown in FIG. 27B in the embodiment.

In Step S142, the learning unit 12 awaits the output of an action signal $u_t$ of an action $u_t$ by selecting the action $u_t$ to be performed at the time t or randomly selecting the action $u_t$ to be performed at the time t by action control of the action control unit 14 (of FIG. 2) using an observation value $o_t$ to acquire the action signal $u_t$, and the process advances to Step S143.

Herein, the action $u_t$ of the time t is any one of five actions $U_1$ to $U_5$ shown in FIG. 27A in the embodiment.

In addition, the actuator 15 (of FIG. 2) is driven according to the action signal $u_t$ output from the action control unit 14, and accordingly, the agent performs the action $u_t$.

In Step S143, the learning unit 12 stores a set of the observation value $o_t$ of the time t acquired from the sensor 11 and the action signal $u_t$ of the time t acquired from the action control unit 14 as a learning data set used in learning of the extended HMM in the form of adding to the history of the learning data set, and the process advances to Step S144.

In Step S144, the learning unit 12 determines whether or not a learning condition for performing learning of the extended HMM is satisfied.

Herein, as the learning condition for learning the extended HMM, addition of a predetermined number of new learning data sets (learning data sets not used in learning of the extended HMM), which is one or greater, to the history, or the like can be employed.

In Step S144, when it is determined that the learning condition is not satisfied, the process returns to Step S141, and the learning unit 12 awaits the output of an observation value $o_{t+1}$ of a time t+1 observed after the agent performed an action $u_t$ from the sensor 11, to acquire the observation value $o_{t+1}$ output from the sensor, and thereafter, the same process is repeated.

In addition, in Step S144, when it is determined that the learning condition is satisfied, the process advances to Step S145, and the learning unit 12 performs learning (updating) of the extended HMM using the learning data sets stored as history.

Then, after the end of learning of the extended HMM, the process returns from Step S145 to Step S141, and thereafter, the same process is repeated.

Figure 29A:
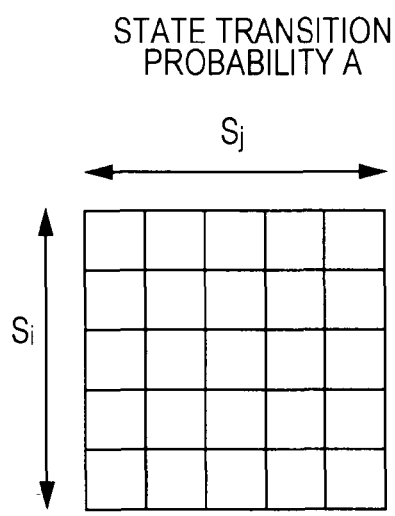
FIGS. 29A and 29B are diagrams illustrating the extended HMM.
Figure 29B:
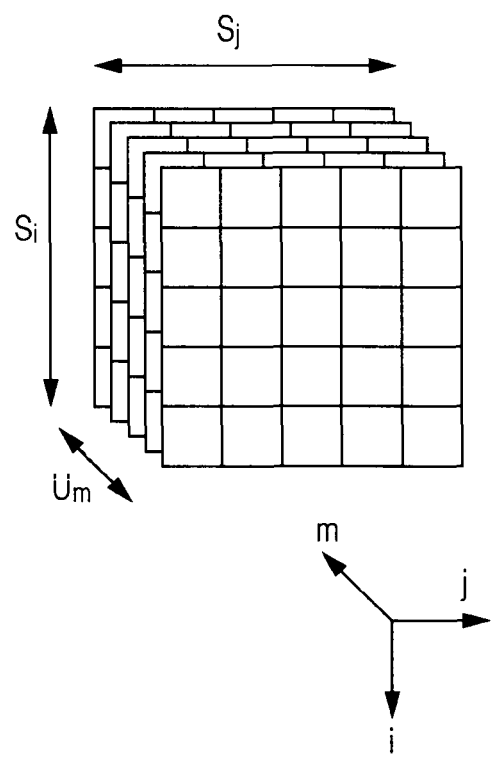

FIGS. 29A and 29B are diagrams illustrating the extended HMM.

In the extended HMM, a (state) transition probability of the general (past) HMM is extended to a transition probability for each action performed by the agent.

In other words, FIG. 29A shows a transition probability of the general HMM.

Now, as the HMM for the extended HMM, an ergodic HMM in which state transition from a state to an arbitrary state is possible is employed. In addition, the number of states of the HMM is set to N.

In the general HMM, a transition probability $a_{ij}$ of N×N state transitions from N-number of states $S_i$ to N-number of states $S_j$ is included as a model parameter.

All transition probabilities of the general HMM can be expressed by a two-dimensional table in which a transition probability $a_{ij}$ of state transition from a state $S_i$ to a state $S_j$ is arranged in the i-th unit from the top and the j-th unit from the left.

Herein, the table of the transition probability of the HMM (including the extended HMM) can be described also as a transition probability A.

FIG. 29B shows the transition probability A of the extended HMM.

In the extended HMM, transition probabilities exist for each action $U_m$ performed by the agent.

Herein, a transition probability of state transition from a state $S_i$ to a state $S_j$ for an action $U_m$ is described also as $a_{ij}(U_m)$.

A transition probability $a_{ij}(U_m)$ indicates a probability with which state transition from a state $S_i$ to a state $S_j$ occurs when the agent performs an action $U_m$.

All transition probabilities of the extended HMM can be expressed with a three-dimensional table in which a transition probability $a_{ij}(U_m)$ a state $S_i$ to a state $S_j$ for an action $U_m$ is arranged in the i-th unit from the top, the j-th unit from the left, and m-th unit from the front side to the depth direction.

Herein, in the three-dimensional table of the transition probability A, the axis of the vertical direction is referred to as an i-axis, the axis of the horizontal direction as the j-axis, and the axis of the depth direction as the m-axis, or the action axis, respectively.

In addition, a plane, which is obtained by cutting the three-dimensional table of the transition probability A with a plane perpendicular to the action axis at a position m of the action axis and is constituted by transition probabilities $a_{ij}(U_m)$, is referred to also as a transition probability plane for an action $U_m$.

Furthermore, a plane, which is obtained by cutting the three-dimensional table of the transition probability A with a plane perpendicular to the i-axis at a position I of the i-axis and is constituted by transition probabilities $a_{ij}(U_m)$, is referred to also as an action plane for a state $S_I$.

Transition probabilities $a_{ij}(U_m)$ constituting an action plane for a state $S_I$ indicates a probability of performing each action $U_m$ when state transition having a state $S_I$ as the transition source occurs.

Furthermore, the extended HMM includes an initial state probability $\pi_i$ of being in a state $S_i$ at the first time t=1 and output probability distribution (herein, discrete probability value) $b_i(O_k)$ that is probability distribution for observing an observation value $O_k$ in the state $S_i$, in addition to transition probabilities $a_{ij}(U_m)$ for each action as model parameters, in the same manner as the general HMM.

Figure 30:
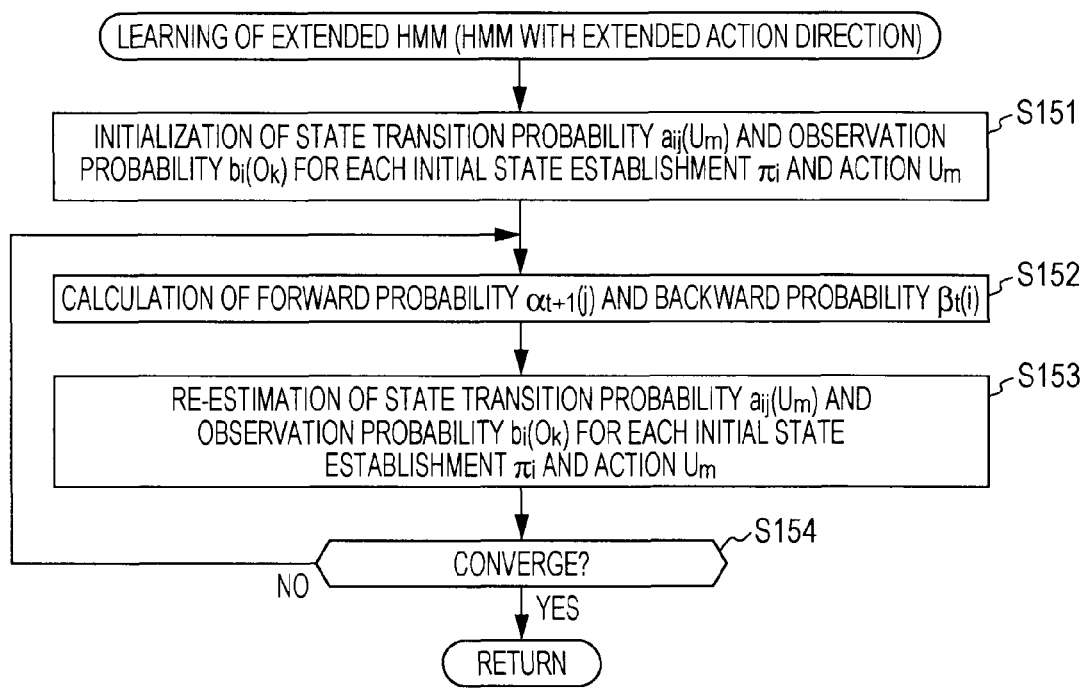
FIG. 30 is a flowchart explaining learning of the extended HMM using a learning data set.

FIG. 30 is a flowchart explaining learning of the extended HMM performed by the learning unit 12 (of FIG. 2) using the learning data sets stored as history in Step S145 of FIG. 28.

In Step S151, the learning unit 12 initializes the extended HMM.

In other words, the learning unit 12 initializes the initial state probability $\pi_i$, the transition probability $a_{ij}(U_m)$ (for each action), and the output probability distribution $b_i(O_k)$ that are model parameters in the extended HMM.

Furthermore, if the number (total number) of states of the extended HMM is set to N, the initial state probability $\pi_i$ is initialized to, for example, 1/N. Herein, if the action environment that is a maze of a two-dimensional plane is constructed by a×b observation units for the width and the length thereof respectively, as the number of states of the extended HMM N, with the setting of an integer for a margin to Δ, (a+Δ)×(b+Δ) can be employed.

In addition, the transition probability $a_{ij}(U_m)$ and the output probability distribution $b_i(O_k)$ are initialized to, for example, random values that can be obtained as probability values.

Herein, the initialization of the transition probability $a_{ij}(U_m)$ is performed so that the sum of transition probabilities $a_{ij}(U_m)$ in each row of the transition probability plane for each action $U_m$, which is $(a_{i,1}(U_m)+a_{i,2}(U_m)+\ldots+a_{i,N}(U_m))$ is 1.0.

In the same manner, the initialization of the output probability distribution $b_i(O_k)$ is performed so that the sum of output probability distribution in which observation values $O_1, O_2, \ldots, O_k$ are observed from each state $S_i$ for the state $S_i$, which is $(b_i(O_1)+b_i(O_2)+\ldots+b_i(O_k))$ is 1.0.

Furthermore, when so-called addition learning is performed, the initial state probability $\pi_i$, the transition probability $a_{ij}(U_m)$, and the output probability distribution $b_i(O_k)$ of the extended HMM that are obtained in learning performed right before the addition learning and stored in the model storage unit 13 are used as initial values without change, and the initialization of Step S151 is not performed.

After Step S151, the process advances to Step S152, and then, in Step S152 and thereafter, learning of the extended HMM is performed in which an initial state probability $\pi_i$, a transition probability $a_{ij}(U_m)$ for each action, and an output probability distribution $b_i(O_k)$ are estimated using the learning data sets stored as history according to a re-estimation method of Baum-Welch (or a method of extending the re-estimation method for actions).

In other words, in Step S152, the learning unit 12 calculates a forward probability $\alpha_{t+1}(j)$ and a backward probability $\beta_t(i)$.

Herein, in the extended HMM, if an action $u_t$ is performed in a time t, state transition is performed from the current state $S_i$ to a state $S_j$, and in the next time t+1, an observation value $o_{t+1}$ is observed in the state $S_j$ after the state transition.

In the extended HMM, the forward probability $\alpha_{t+1}(j)$ indicates a probability P of being in a state $S_i$ in the time t+1, which is $P(o_1, o_2, \ldots, o_{t+1}, u_1, u_2, \ldots, u_t, s_{t+1}=j|\hat{})$, as a sequence of action signals of the learning data set as history (action sequence) $u_1, u_2, \ldots u_t$ is observed, and a sequence of observation values (observation value sequence) $o_1, o_2, \ldots, o_{t+1}$ is observed in a model $\hat{}$ that is the current extended HMM (extended HMM normalized with the initial state probability $\pi_i$, the transition probability $a_{ij}(U_m)$, and the output probability distribution $b_i(O_k)$ that are initialized or currently stored in the model storage unit 13), and expressed by Formula (17).

$$\alpha_{t+1}(j) = P\left(\begin{array}{c} o_1, o_2, \ldots, o_{t+1}, u_1, u_2, \ldots, \\ u_t, s_{t+1} = j | \Lambda \end{array}\right) \quad \text{[Expression 17]}$$

$$= \sum_{i=1}^{N} \alpha_t(i) a_{ij}(u_t) b_j(o_{t+1})$$

Furthermore, a state $s_t$ indicates a state of being in a time t, and is any one of states $S_1$ to $S_N$ when the number of states of the extended HMM is N. In addition, a formula $s_{t+1}=j$ indicates that a state $s_{t+1}$ of being in a time t+1 is a state $S_j$.

The forward probability $\alpha_{t+1}(j)$ of Formula (17) indicates a probability that state transition occurs and an observation value $o_{t+1}$ in a state $S_j$ in a time t+1 is observed by performing (observing) an action $u_t$ when the action sequence $u_1, u_2, \ldots, u_{t-1}$ and the observation value sequence $o_1, o_2, \ldots, o_t$ in the learning data set are observed and the agent is in the state $s_t$ in the time t.

Furthermore, the initial value $a_1(j)$ of the forward probability $\alpha_{t+1}(j)$ is expressed by Formula (18).

$$\alpha_1(j) = \pi_j b_j(o_1) \quad \text{[Expression 18]}$$

The initial value $\alpha_1(j)$ of Formula (18) indicates a probability of observing the observation value $o_1$ in the state $S_j$ at first (time t=1).

In addition, in the extended HMM, the backward probability $\beta_t(i)$ is a probability P of being in a state $S_i$ in the time t and thereafter, observing an action sequence $u_{t+1}, u_{t+2}, \ldots, u_{T-1}$ of the learning data set and observing an observation value sequence $o_{t+1}, o_{t+2}, \ldots, o_T$, which is $P(o_{t+1}, o_{t+2}, \ldots, o_T, u_{t+1}, u_{t+2}, \ldots, u_{T-1}, s_t=i|\hat{})$, in a model $\hat{}$ that is the current extended HMM, and expressed by Formula (19).

$$\beta_t(i) = P\left(\begin{array}{c} o_{t+1}, o_{t+2}, \ldots, o_T, u_{t+1}, u_{t+2}, \ldots, \\ u_{T-1}, s_t = j | \Lambda \end{array}\right) \quad \text{[Expression 19]}$$

$$= \sum_{j=1}^{N} a_{ij}(u_t) b_j(o_{t+1}) \beta_{t+1}(j)$$

Furthermore, T indicates the number of observation values (sequence length) of the observation sequence in the learning data set.

The backward probability $\beta_t(i)$ of Formula (19) indicates a probability that the agent is in a state $S_j$ in a time t+1, and thereafter, that a state $s_t$ of a time t is a state $S_i$ when state transition occurs by performing an action $u_t$ (observed) in the state $S_i$ at the time t, a state $s_{t+1}$ of the time t+1 is the state $S_j$, and the observation value $o_{t+1}$ is observed when the action sequence of the learning data set $u_{t+1}, u_{t+2}, \ldots, u_{T-1}$ is observed and the observation value sequence $o_{t+2}, o_{t+3}, \ldots, o_T$, is observed.

Furthermore, the initial value $\beta_T(i)$ of the backward probability $\beta_t(i)$ is expressed by Formula (20).

$$\beta_T(i) = 1 \quad \text{[Expression 20]}$$

The initial value $\beta_T(i)$ of Formula (20) indicates that the probability of being in the state $S_i$ finally (time t=T) is 1.0, that is, of necessarily being in the state $S_i$ finally.

In the extended HMM, as shown in Formulas (17) and (19), using a transition probability $a_{ij}(u_t)$ for each action as a transition probability from a state $S_i$ to a state $S_j$ is different from the general HMM.

In Step S152, after the forward probability $\alpha_{t+1}(j)$ and the backward probability $\beta_t(i)$ are calculated, the process advances to Step S153, and the learning unit 12 re-estimates the initial state probability $\pi_i$, the transition probability $a_{ij}(U_m)$ for each action $U_m$, and the output probability distribution $b_i(O_k)$ that are model parameters $\hat{}$ of the extended HMM using the forward probability $\alpha_{t+1}(j)$ and the backward probability $\beta_t(i)$.

Herein, re-estimation of the model parameters is accompanied by extension of a transition probability to the transition probability $a_{ij}(U_m)$ for each action $U_m$, and the re-estimation method of Baum-Welch is extended to perform as above.

In other words, in the model $\hat{}$ of the current extended HMM, when the action sequence $U=u_1, u_2, \ldots, u_{T-1}$ and the observation value sequence $O=o_1, o_2, \ldots, o_T$ are observed, a probability $\xi_{t+1}(i,j,U_m)$ of performing state transition to the state $S_j$ in the time t+1 by performing an action $U_m$ in the state $S_i$ in the time t is expressed by Formula (21) using the forward probability $\alpha_t(i)$ and the backward probability $\beta_{t+1}(j)$.

$$\xi_{t+1}(i, j, U_m) = P\left(\begin{array}{c} s_t = i, s_{t+1} = j, u_t = \\ U_m | O, U, \Lambda \end{array}\right) \quad \text{[Expression 21]}$$

$$= \frac{\alpha_t(i) a_{ij}(U_m) b_j(o_{t+1}) \beta_{t+1}(j)}{P(O, U | \Lambda)}$$

$$(1 \leq t \leq T - 1)$$

Furthermore, a probability $\gamma_t(i,U_m)$ with which an action $u_t=U_m$ in the state $S_i$ in the time t can be calculated as a probability marginalized with respect to the state $S_j$ in the time t+1 for the probability $\xi_{t+1}(i,j,U_m)$, and expressed by Formula (22).

$$\gamma_t(i, U_m) = P(s_t = i, u_t = U_m | O, U, \Lambda) \quad \text{[Expression 22]}$$

$$= \sum_{j=1}^{N} \xi_{t+1}(i, j, U_m)$$

$$(1 \leq t \leq T - 1)$$

The learning unit 12 performs re-estimation of the model parameters $\hat{}$ of the extended HMM, using the probability $\xi_{t+1}(i,j,U_m)$ of Formula (21), and the probability $\gamma_t(i,U_m)$ of Formula (22).

Herein, if an observation value obtained after performing re-estimation of the model parameters ˆ is indicated by a model parameter ˆ' using a single quotation mark ('), an estimation value $\pi'_i$ of the initial state probability that is a model parameter ˆ' is obtained according to Formula (23).

$$\pi'_i = \frac{\alpha_1(i)\beta_1(i)}{P(O, U | \Lambda)} (1 \leq i \leq N) \qquad \text{[Expression 23]}$$

In addition, an estimation value $a'_{ij}(U_m)$ of a transition probability for each action that is a model parameter ˆ' is obtained according to Formula (24).

$$a'_{ij}(U_m) = \frac{\sum_{t=1}^{T-1} \xi_{t+1}(i, j, U_m)}{\sum_{t=1}^{T-1} \gamma_t(i, U_m)} \qquad \text{[Expression 24]}$$

$$= \frac{\sum_{t=1}^{T-1} \alpha_t(i) a_{ij}(U_m) b_j(o_{t+1}) \beta_{t+1}(j)}{\sum_{t=1}^{T-1} \sum_{j=1}^{N} \alpha_t(i) a_{ij}(U_m) b_j(o_{t+1}) \beta_{t+1}(j)}$$

Herein, the numerator of the estimation value $a'_{ij}(U_m)$ of a transition probability in Formula (24) indicates an expectation value of the number of state transitions to the state $S_j$ after performing the action $u_t=U_m$ in the state $S_i$, and the denominator thereof indicates an expectation value of the number of state transitions after performing the action $u_t=U_m$ in the state $S_i$.

An estimation value $b'_j(O_k)$ of output probability distribution that is a model parameter ˆ' is obtained according to Formula (25).

$$b'_j(O_k) = \frac{\sum_{t=1}^{T-1} \sum_{i=1}^{N} \sum_{m=1}^{M} \xi_{t+1}(i, j, U_m, O_k)}{\sum_{t=1}^{T-1} \sum_{i=1}^{N} \sum_{m=1}^{M} \xi_{t+1}(i, j, U_m)} \qquad \text{[Expression 25]}$$

$$= \frac{\sum_{t=1}^{T-1} \alpha_{t+1}(j) b_j(O_k) \beta_{t+1}(j)}{\sum_{t=1}^{T-1} \alpha_{t+1}(j) \beta_{t+1}(j)}$$

Herein, the numerator of the estimation value $b'_j(O_k)$ of output probability distribution in Formula (25) indicates an expectation value of the number of observation of an observation value $O_k$ in the state $S_j$ after performing the state transition to the state $S_j$, and the denominator thereof indicates an expectation value of the number of state transitions to the state $S_j$.

In Step S153, after re-estimation of the initial state probability, transition probability, and estimation values of output probability distribution of $a'_{ij}(U_m)$ and $b'_j(O_k)$, which are model parameters ˆ', the learning unit 12 causes the model storage unit 13 to store the estimation value $\pi'_i$ as a new initial state probability $\pi_i$, the estimation value $a'_{ij}(U_m)$ as a new transition probability $a_{ij}(U_m)$, and the estimation value $b'_j(O_k)$ as a new output probability distribution $b_j(O_k)$, in the form of overwriting, and the process advances to Step S154.

In Step S154, it is determined whether or not the model parameters of the extended HMM, that is, the (new) initial state probability $\pi_i$, transition probability $a_{ij}(U_m)$, and output probability distribution $b_j(O_k)$ stored in the model storage unit 13 converge.

In Step S154, when it is determined that the model parameters of the extended HMM have not converged yet, the process returns to Step S152, and the same process is repeated using the new initial state probability $\pi_i$, transition probability $a_{ij}(U_m)$, and output probability distribution $b_j(O_k)$ stored in the model storage unit 13.

In addition, in Step S154, when it is determined that the model parameters of the extended HMM converged, that is, when the model parameters of the extended HMM are not changed, for example, before and after re-estimation of Step S153, the process of learning of the extended HMM ends.

As the state transition model $P_{SS'}{}^U$ of Formula (15) (and Formula (16)), a transition probability $a_{ij}(U)$ for each action U of the extended HMM obtained by learning as above can be used, and in that case, the state of the state transition model $P_{SS'}{}^U$ coincides with the state of the extended HMM.

[Description of Computer to which the Disclosure is Applied]

Next, the series of processes described above can be performed by hardware, and also performed by software. When the series of processes is performed by software, a program constituting the software is installed in a general-purpose computer, or the like.

Figure 31:
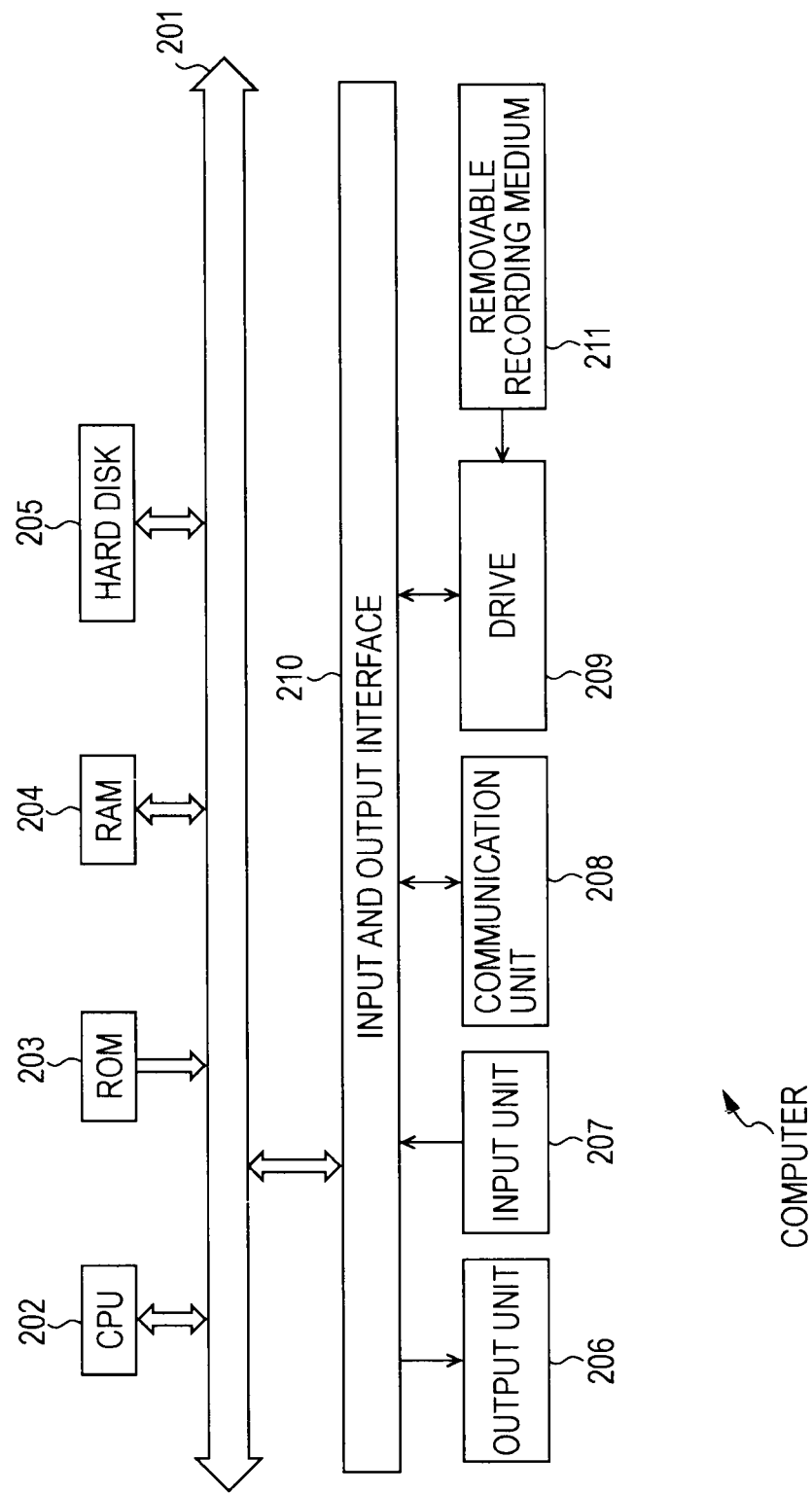
FIG. 31 is a block diagram showing a configuration example of an embodiment of a computer to which the disclosure is applied.

Thus, FIG. 31 shows a configuration example of an embodiment of a computer in which a program for executing the series of processes described above is installed.

The program can be recorded in advance on a hard disk 205 or a ROM 203 as a recording medium included in the computer.

Alternatively, the program can be stored (recorded) in a removable recording medium 211. Such a removable recording medium 211 can be provided as package software. As the removable recording medium 211 here, for example, a flexible disc, a CD-ROM (Compact Disc Read Only Memory), a MO (Magneto Optical) disc, a DVD (Digital Versatile Disc), a magnetic disk, a semiconductor memory, or the like.

Furthermore, the program can be installed in the computer from the removable recording medium 211 as described above, downloaded to the computer through a communication network, or a broadcasting network, and installed in the hard disk 205 included therein. In other words, the program is wirelessly transferred to the computer from a downloading site through a satellite for digital satellite broadcasting, or can be transferred by wires to the computer through a network such as a LAN (Local Area Network), or the Internet.

The computer includes a CPU (Central Processing Unit) 202, and the CPU 202 is connected to an input and output interface 210 through a bus 201.

If a user inputs a command by operating an input unit 207, or the like, through the input and output interface 210, the CPU 202 executes a program stored in the ROM (Read Only Memory) 203 according thereto. Alternatively, the CPU 202 loads a program stored in the hard disk 205 to a RAM (Random Access Memory) 204 to execute.

Accordingly, the CPU 202 performs processes according to the above-described flowcharts, or processes performed the configurations of the above-described block diagrams. In addition, the CPU 202 causes an output unit 206 to output, the communication unit 208 to transmit, or the hard disk 205 to record the process results through, for example, the input and output interface 210 depending on necessity.

Furthermore, the input unit 207 includes a keyboard, a mouse, a microphone, or the like. In addition, the output unit 206 includes an LCD (Liquid Crystal Display), a speaker, or the like.

Herein, in the present specification, it is not necessary that a process performed by a computer based on a program is performed in time series following the order described as a flowchart. In other words, a process performed by a computer based on a program includes a process executed in parallel or individually (for example, a parallel process or a process by an object).

In addition, a program may perform a process by one computer (processor), or distributed processes by a plurality of computers. Furthermore, a program may be executed by being transferred to a remote computer.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing device comprising:
one or more processors operable to:
calculate a state value having a predetermined state of a state transition model set as a reference, wherein a value of the state value increases as much as a state with a high transition probability to another state close to the predetermined state, wherein a state in the state transition model is transited by an action performed by an agent, and wherein the state value is calculated for each state of the state transition model based on the state transition model of each action;
calculate an action value, for each state of the state transition model and each action that the agent can perform, based on the state transition model and the state value having the predetermined state set as the reference, wherein a value of the action value increases as a transition probability to a state with a high state value having the predetermined state set as the reference increases;
set a state with a variance in the action value higher than a predetermined threshold among states of the state transition model to a target state, the target state being a target to reach by an action performed by the agent; and
select an action of the agent so as to move toward the target state.

2. The data processing device according to claim 1, wherein the one or more processors are operable to:
recognize a current state which is a state where an observation value, which is observed by the agent from the outside, is observed among states of the state transition model based on the observation value, wherein the predetermined state is the current state, and
calculate a state value having the current state set as a reference, of which the value increases as much as a state with a high transition probability to a state close to the current state.

3. The data processing device according to claim 2, wherein the one or more processors are further operable to:
calculate a state value having the target state set as a reference, of which the value increases as a state with a high transition probability to a state close to the target state, for each state of the state transition model based on the state transition model;
calculate an action value of which the value increases as high as a transition probability to a state with a high state value having the target state set as a reference for each state of the state transition model and each action that the agent can perform based on the state transition model and the state value having the target state set as a reference; and
select an action of the agent so as to move toward the target state based on an action value of the current state.

4. The data processing device according to claim 3, wherein the one or more processors are further operable to: update a state transition model for an action of the agent, in which state transition to the current state occurs, based on the state transition to the current state.

5. The data processing device according to claim 4, wherein the state transition model for a predetermined action indicates a frequency of transition to a second state by the predetermined action by the agent in a first state, and wherein the one or processors are further operable to update the state transition model by increasing the frequency.

6. The data processing device according to claim 5, wherein the agent acts in an action environment where the agent acts, assuming a predetermined space as the action environment, and observes a position of the agent in the action environment as the observation value, and wherein the state indicates a small area obtained by dividing the action environment into such small areas.

7. The data processing device according to claim 6, wherein the one or more processors are further operable to determine whether or not the current state coincides with the target state, and select an action of the agent so as to move toward the target state based on an action value of the current state when the current state does not coincide with the target state.

8. The data processing device according to claim 7, wherein, when the current state coincides with the target state, the one or more processors are further operable to:
re-calculate a state value having the current state set as a reference based on the state transition model;
re-calculate the action value based on the state transition model and the state value having the current state set as a reference; and
re-set the target state based on the action value.

9. The data processing device according to claim 2, wherein the one or more processors are operable to obtain a variance of the action value for each state of the state transition model, and set a state to be reached from the current state by state transitions within a predetermined number of times among states, in which a variance of the action value is equal to or higher than a predetermined threshold value, to the target state.

10. The data processing device according to claim 2, wherein the one or more processors are further operable to select an action of the agent so as to move toward the target state based on the action value of the current state with a δ-greedy method or a softmax method.

11. A data processing method, comprising:
in a data processing device:
calculating a state value having a predetermined state of a state transition model set as a reference, wherein a value of the state value increases as much as a state with a high transition probability to another state close to the predetermined state, wherein a state in the state transition model is transited by an action performed by an agent, and wherein the state value is calculated for each state of the state transition model based on the state transition model of each action;
calculating an action value, for each state of the state transition model and each action that the agent can perform, based on the state transition model and the state value having the predetermined state set as the reference, wherein a value of the action value increases as a transition probability to a state with a high state value having the predetermined state set as the reference increases;

setting a state with a variance in the action value higher than a predetermined threshold among states of the state transition model to a target state, the target state being a target to reach by an action performed by the agent, based on the action value; and selecting an action of the agent so as to move toward the target state.

12. A non-transitory computer-readable storage medium having stored thereon, a computer program having at least one code section for processing, the at least one code section being executable by a computer for causing the computer to perform steps comprising:

calculating a state value having a predetermined state of a state transition model set as a reference, wherein a value of the state value increases as much as a state with a high transition probability to another state close to the predetermined state, wherein a state in the state transition model is transited by an action performed by an agent, and wherein the state value is calculated for each state of the state transition model based on the state transition model of each action;

calculating an action value, for each state of the state transition model and each action that the agent can perform, based on the state transition model and the state value having the predetermined state set as the reference, wherein a value of the action value increases as a transition probability to a state with a high state value having the predetermined state set as the reference increases;

setting a state with a variance in the action value higher than a predetermined threshold among states of the state transition model to a target state, the target state being a target to reach by action performed by the agent, based on the action value; and selecting an action of the agent so as to move toward the target state.

13. The data processing method according to claim 11, further comprising:

recognizing a current state which is a state where an observation value, which is observed by the agent from the outside, is observed among states of the state transition model based on the observation value, wherein the predetermined state is the current state; and calculating a state value having the current state set as a reference, of which the value increases as much as a state with a high transition probability to a state close to the current state.

14. The data processing method according to claim 13, further comprising:

calculating a state value having the target state set as a reference, of which the value increases as a state with a high transition probability to a state close to the target state, for each state of the state transition model based on the state transition model;

calculating an action value of which the value increases as high as a transition probability to a state with a high state value having the target state set as a reference for each state of the state transition model and each action that the agent can perform based on the state transition model and the state value having the target state set as a reference; and selecting an action of the agent so as to move toward the target state based on an action value of the current state.

15. The data processing device according to claim 14, further comprising:

updating a state transition model for an action of the agent, in which state transition to the current state occurs, based on the state transition to the current state.

16. The data processing method according to claim 13, further comprising obtaining a variance of the action value for each state of the state transition model, and setting a state to be reached from the current state by state transitions within a predetermined number of times among states, in which a variance of the action value is equal to or higher than a predetermined threshold value, to the target state.

17. The data processing method according to claim 13, further comprising selecting an action of the agent so as to move toward the target state based on the action value of the current state with a 6-greedy method or a softmax method.

18. A data processing device comprising:

one or more processors operable to:

calculate a state value having a predetermined state of a state transition model set as a reference, wherein a value of the state value increases as much as a state with a high transition probability to another state close to the predetermined state, wherein a state in the state transition model is transited by an action performed by an agent and wherein the state value is calculated for each state of the state transition model based on the state transition model of each action;

calculate an action value, for each state of the state transition model and each action that the agent can perform, based on the state transition model and the state value having the predetermined state set as the reference, wherein a value of the action value increases as a transition probability to a state with a high state value having the predetermined state set as the reference increases;

set a state among states of the state transition model with a variance in the action value higher than a predetermined threshold to a target state, based on the action value, the target state being a target to reach by an action performed by the agent;

select an action of the agent so as to move toward the target state;

recognize a current state which is a state where an observation value, which is observed by the agent from the outside, is observed among states of the state transition model based on the observation value, wherein the predetermined state is the current state;

calculate a state value having the current state set as a reference, of which the value increases as much as a state with a high transition probability to a state close to the current state calculate a state value having the target state set as a reference, of which the value increases as a state with a high transition probability to a state close to the target state, for each state of the state transition model based on the state transition model;

calculate an action value of which the value increases as high as a transition probability to a state with a high state value having the target state set as a reference for each state of the state transition model and each action that the agent can perform based on the state transition model and the state value having the target state set as a reference; and select an action of the agent so as to move toward the target state based on an action value of the current state.

* * * * *